United States Patent
Tibor et al.

(10) Patent No.: US 9,623,437 B2
(45) Date of Patent: Apr. 18, 2017

(54) DIE WITH FLOW DIFFUSING GATE PASSAGE AND METHOD FOR IMPREGNATING SAME FIBER ROVINGS

(75) Inventors: Timothy L. Tibor, Winona, MN (US); Timothy A. Regan, Winona, MN (US); Aaron H. Johnson, Winona, MN (US)

(73) Assignee: Ticona LLC, Florence, KY (US)

( * ) Notice: Subject to any disclaimer, the term of this patent is extended or adjusted under 35 U.S.C. 154(b) by 692 days.

(21) Appl. No.: 14/112,636

(22) PCT Filed: Apr. 26, 2012

(86) PCT No.: PCT/US2012/035153
§ 371 (c)(1),
(2), (4) Date: Dec. 11, 2013

(87) PCT Pub. No.: WO2012/149127
PCT Pub. Date: Nov. 1, 2012

(65) Prior Publication Data
US 2015/0044377 A1 Feb. 12, 2015

Related U.S. Application Data

(60) Provisional application No. 61/480,501, filed on Apr. 29, 2011.

(51) Int. Cl.
*B05C 11/00* (2006.01)
*B05C 5/02* (2006.01)
(Continued)

(52) U.S. Cl.
CPC ............ *B05C 11/021* (2013.01); *B05C 5/027* (2013.01); *B05C 5/0241* (2013.01);
(Continued)

(58) Field of Classification Search
CPC ............................ B05C 11/021; B05C 5/0245
(Continued)

(56) References Cited

U.S. PATENT DOCUMENTS

| 1,078,448 A | 11/1913 | Marcoft |
| 1,111,500 A | 9/1914 | Schautz et al. |

(Continued)

FOREIGN PATENT DOCUMENTS

| AT | EP 0712716 A1 * | 5/1996 | ........... B29C 70/526 |
| CN | 201645833 U | 11/2010 | |

(Continued)

OTHER PUBLICATIONS

Abstract of Japanese Patent—JPS599206, Jan. 18, 1984, 2 pages.

*Primary Examiner* — Cachet Sellman
(74) *Attorney, Agent, or Firm* — Dority & Manning, P.A.

(57) ABSTRACT

A die and a method for impregnating fiber rovings with a polymer resin are disclosed. The die includes a manifold assembly (220), an impregnation zone (250), and a gate passage (270). The manifold assembly (220) flows the resin therethrough, and includes a channel (222). The impregnation zone (250) is in fluid communication with the manifold assembly (220), and is configured to impregnate the roving with the resin. The gate passage (270) is between the manifold assembly (220) and the impregnation zone (250), and flows the resin from the manifold assembly (220) such that the resin coats the roving. The gate passage (270) includes a projection (300). The projection (300) is configured to diffuse resin flowing through the gate passage (270).

18 Claims, 18 Drawing Sheets

(51) Int. Cl.
  *B05C 11/02* (2006.01)
  *B29C 47/02* (2006.01)
  *B29C 47/14* (2006.01)
  *B29C 47/70* (2006.01)
  *B29C 47/00* (2006.01)
  *B05D 1/26* (2006.01)
  *B29B 15/12* (2006.01)
  *B29C 47/28* (2006.01)
  *B29C 47/32* (2006.01)
  *B29K 105/08* (2006.01)

(52) U.S. Cl.
  CPC ............ *B05C 5/0245* (2013.01); *B05D 1/265* (2013.01); *B29B 15/122* (2013.01); *B29C 47/0014* (2013.01); *B29C 47/02* (2013.01); *B29C 47/14* (2013.01); *B29C 47/705* (2013.01); *B29C 47/28* (2013.01); *B29C 47/32* (2013.01); *B29K 2105/08* (2013.01)

(58) Field of Classification Search
  USPC .................................................. 118/125
  See application file for complete search history.

(56) References Cited

U.S. PATENT DOCUMENTS

| | | |
|---|---|---|
| 1,898,085 A | 2/1933 | Dreyfus et al. |
| 3,647,526 A | 3/1972 | Barnes |
| 3,803,665 A * | 4/1974 | Winterburn ............ D21G 3/005 100/174 |
| 3,803,965 A | 4/1974 | Alderfer |
| 4,017,240 A * | 4/1977 | Nelson ..................... B29C 47/14 137/561 A |
| 4,531,959 A * | 7/1985 | Kar ........................ C03C 25/18 118/125 |
| 4,565,153 A * | 1/1986 | Corley .................. B29B 15/122 118/405 |
| 4,588,538 A * | 5/1986 | Chung .................. B29B 15/122 264/136 |
| 4,643,126 A | 2/1987 | Wilkinson et al. |
| 4,720,366 A | 1/1988 | Binnersley et al. |
| 4,728,387 A | 3/1988 | Hilakos |
| RE32,772 E | 10/1988 | Hawley |
| 4,775,434 A * | 10/1988 | Rolston ..................... B05C 3/15 118/125 |
| 4,864,964 A | 9/1989 | Hilakos |
| 4,883,625 A | 11/1989 | Glemet et al. |
| 4,923,134 A | 5/1990 | Kinnan |
| 4,957,422 A | 9/1990 | Glemet et al. |
| 4,997,703 A | 3/1991 | Gehrig |
| 5,002,712 A | 3/1991 | Goldmann et al. |
| 5,068,142 A | 11/1991 | Nose et al. |
| 5,084,305 A | 1/1992 | Marttila |
| 5,114,516 A | 5/1992 | Pilling et al. |
| 5,114,633 A | 5/1992 | Stewart |
| 5,116,450 A | 5/1992 | Spoo et al. |
| 5,207,850 A | 5/1993 | Parekh |
| 5,268,050 A | 12/1993 | Azari |
| 5,277,566 A * | 1/1994 | Augustin .............. B29B 15/122 264/136 |
| 5,294,461 A | 3/1994 | Ishida |
| 5,529,652 A | 6/1996 | Asai et al. |
| 5,544,646 A * | 8/1996 | Lloyd .................... A61M 15/00 128/200.14 |
| 5,632,838 A * | 5/1997 | Weidner ................ B29C 70/525 118/125 |
| 5,658,513 A * | 8/1997 | Amaike ..................... B29B 9/14 156/180 |
| 5,783,129 A * | 7/1998 | Shirai .................... B29B 15/122 156/180 |
| 5,798,068 A | 8/1998 | Vlug |
| 5,863,332 A | 1/1999 | Foster et al. |
| 5,895,808 A | 4/1999 | Schmid et al. |
| 5,935,508 A | 8/1999 | Fernyhough et al. |
| 5,948,473 A | 9/1999 | Saito et al. |
| 6,045,876 A | 4/2000 | Fellers et al. |
| 6,048,598 A | 4/2000 | Bryan, III et al. |
| 6,090,319 A | 7/2000 | Sharma et al. |
| 6,117,591 A | 9/2000 | Takeuchi et al. |
| 6,244,014 B1 | 6/2001 | Barmakian |
| 6,248,262 B1 | 6/2001 | Kubotera et al. |
| 6,258,453 B1 | 7/2001 | Montsinger |
| 6,260,343 B1 | 7/2001 | Pourladian |
| 6,270,851 B1 | 8/2001 | Lee et al. |
| 6,329,056 B1 | 12/2001 | Deve et al. |
| 6,334,293 B1 | 1/2002 | Poethke et al. |
| 6,344,270 B1 | 2/2002 | McCullough et al. |
| 6,346,325 B1 | 2/2002 | Edwards et al. |
| 6,391,959 B1 | 5/2002 | Ninomiya et al. |
| 6,455,143 B1 | 9/2002 | Ishibashi et al. |
| 6,517,654 B1 | 2/2003 | Heckel et al. |
| 6,656,316 B1 | 12/2003 | Dyksterhouse |
| 6,658,836 B2 | 12/2003 | Nguyen et al. |
| 6,749,413 B2 * | 6/2004 | Fare' .................... D01D 4/025 425/192 S |
| 6,846,857 B1 | 1/2005 | Lindner |
| 6,872,343 B2 | 3/2005 | Edwards et al. |
| 7,015,395 B2 | 3/2006 | Goldsworthy et al. |
| 7,059,091 B2 | 6/2006 | Paulshus et al. |
| 7,060,326 B2 | 6/2006 | Hiel et al. |
| 7,093,416 B2 | 8/2006 | Johnson et al. |
| 7,131,308 B2 | 11/2006 | McCullough et al. |
| 7,179,522 B2 | 2/2007 | Hiel et al. |
| 7,211,319 B2 | 5/2007 | Hiel et al |
| 7,220,492 B2 | 5/2007 | Fick et al. |
| 7,291,263 B2 | 11/2007 | Ward et al. |
| 7,326,854 B2 | 2/2008 | Varkey |
| 7,368,162 B2 | 5/2008 | Hiel et al. |
| 7,402,753 B2 | 7/2008 | Varkey et al. |
| 7,438,971 B2 | 10/2008 | Bryant et al. |
| 7,650,742 B2 | 1/2010 | Ushijima |
| 7,705,242 B2 | 4/2010 | Winterhalter |
| 7,754,966 B2 | 7/2010 | Figenschou |
| 2001/0010248 A1 | 8/2001 | Vodermayer et al. |
| 2002/0019182 A1 | 2/2002 | Ishibashi et al. |
| 2002/0041049 A1 | 4/2002 | McCullough |
| 2002/0125603 A1 | 9/2002 | Sakai et al. |
| 2003/0037529 A1 | 2/2003 | Hanna et al. |
| 2003/0082380 A1 | 5/2003 | Hager et al. |
| 2003/0157280 A1 | 8/2003 | Boissonnat et al. |
| 2004/0098963 A1 | 5/2004 | Calleeuw et al. |
| 2004/0115422 A1 | 6/2004 | Levit et al. |
| 2004/0182597 A1 | 9/2004 | Smith et al. |
| 2004/0224590 A1 | 11/2004 | Rawa et al. |
| 2004/0265558 A1 | 12/2004 | Berard |
| 2005/0181228 A1 | 8/2005 | McCullough et al. |
| 2005/0186410 A1 | 8/2005 | Bryant et al. |
| 2005/0244231 A1 | 11/2005 | Liao et al. |
| 2006/0021729 A1 | 2/2006 | Werner et al. |
| 2006/0024489 A1 | 2/2006 | Werner et al. |
| 2006/0024490 A1 | 2/2006 | Werner et al. |
| 2006/0049541 A1 | 3/2006 | Sutton et al. |
| 2006/0204739 A1 | 9/2006 | Papke et al. |
| 2007/0128435 A1 | 6/2007 | Hiel et al. |
| 2007/0193767 A1 | 8/2007 | Guery et al. |
| 2007/0202331 A1 | 8/2007 | Davis et al. |
| 2007/0227646 A1 * | 10/2007 | Yano .................... B29B 15/122 156/180 |
| 2007/0269645 A1 | 11/2007 | Raghavendran et al. |
| 2007/0271897 A1 | 11/2007 | Hanna et al. |
| 2008/0006337 A1 | 1/2008 | Quigley et al. |
| 2008/0141614 A1 | 6/2008 | Knouff et al. |
| 2008/0250631 A1 | 10/2008 | Buckley |
| 2008/0282664 A1 | 11/2008 | Chou |
| 2008/0282666 A1 | 11/2008 | Chou |
| 2009/0229452 A1 | 9/2009 | Milwich et al. |
| 2010/0038112 A1 | 2/2010 | Grether |
| 2010/0163275 A1 | 7/2010 | Hiel et al. |
| 2010/0181012 A1 | 7/2010 | Hiel et al. |
| 2010/0206606 A1 | 8/2010 | Winterhalter |
| 2012/0273988 A1 | 11/2012 | Eastep et al. |
| 2012/0321804 A1 | 12/2012 | Regan et al. |

(56) References Cited

U.S. PATENT DOCUMENTS

| | | |
|---|---|---|
| 2013/0145986 A1 | 6/2013 | Regan |
| 2013/0147082 A1 | 6/2013 | Johnson et al. |
| 2013/0147083 A1 | 6/2013 | Eastep et al. |
| 2013/0147084 A1 | 6/2013 | Johnson et al. |

FOREIGN PATENT DOCUMENTS

| | | |
|---|---|---|
| DE | 19827524 A1 | 12/1999 |
| EP | 0320653 A2 | 11/1988 |
| EP | 0383290 A1 | 8/1990 |
| EP | 0415517 A1 | 3/1991 |
| EP | 0520347 A1 | 12/1992 |
| EP | 0707939 A2 | 4/1996 |
| EP | 0712716 A1 | 5/1996 |
| EP | 0712716 A1 | 5/1996 |
| EP | 1291332 A2 | 3/2003 |
| EP | 1775092 A1 | 4/2007 |
| EP | 1790448 A1 | 5/2007 |
| FR | 2 836 591 A1 | 8/2003 |
| GB | 2240997 A | 8/1991 |
| JP | 58-138616 A | 8/1983 |
| JP | 03-119188 A | 5/1991 |
| JP | 05-033278 A | 7/1991 |
| JP | 05-148780 A | 11/1991 |
| JP | 05-050432 A | 3/1993 |
| JP | 06-071724 A | 3/1994 |
| JP | H06262624 A | 9/1994 |
| JP | 07-279940 A | 10/1995 |
| JP | 11-348140 A | 12/1999 |
| JP | 2001-300935 A | 10/2001 |
| JP | 2004-300609 A | 10/2004 |
| WO | WO 99/57413 A1 | 11/1999 |
| WO | WO 2004/026565 A1 | 4/2004 |
| WO | WO 2004/080698 A1 | 9/2004 |
| WO | WO 2008/075964 A1 | 6/2008 |
| WO | WO 2009/130525 A1 | 10/2009 |
| WO | WO 2011/163349 A2 | 12/2011 |
| WO | WO 2011/163357 A2 | 12/2011 |
| WO | WO 2011/163365 A2 | 12/2011 |
| WO | WO 2012/141688 A1 | 10/2012 |
| WO | WO 2012/141689 A1 | 10/2012 |
| WO | WO 2012/149122 A1 | 11/2012 |
| WO | WO 2012/149129 A1 | 11/2012 |
| WO | WO 2013/016121 A1 | 1/2013 |
| WO | WO 2013/086258 A1 | 6/2013 |

* cited by examiner

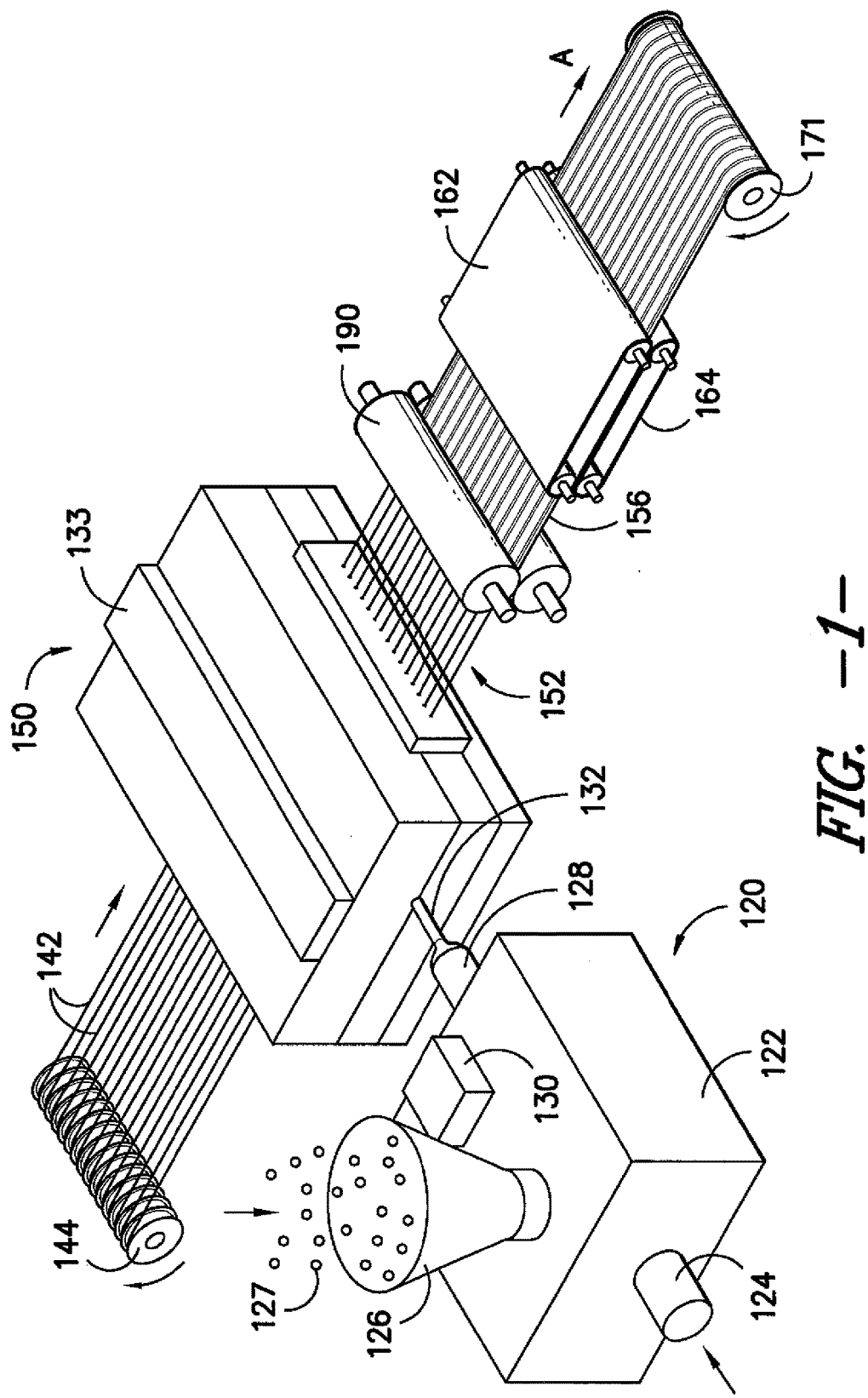
FIG. -1-

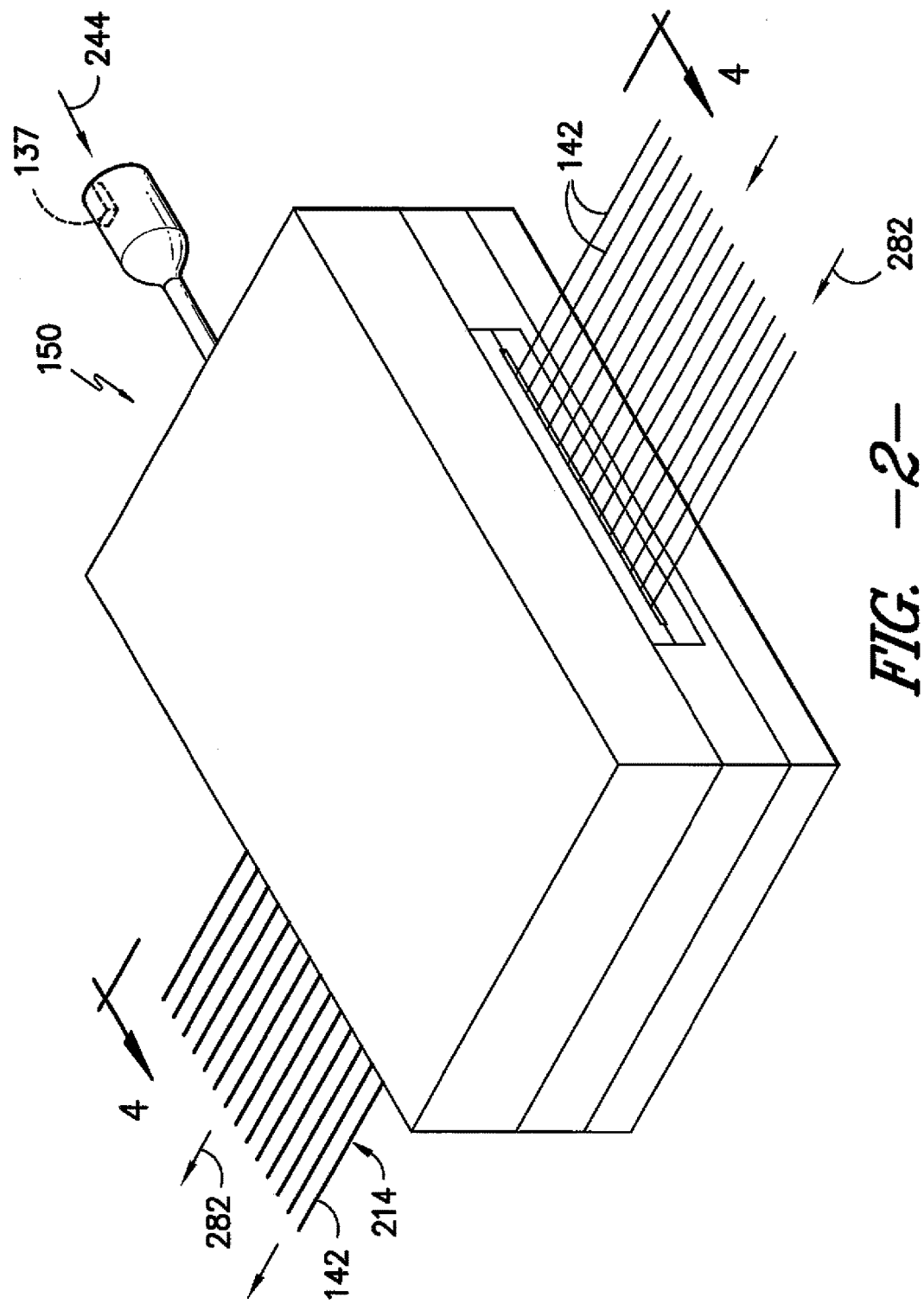
FIG. -2-

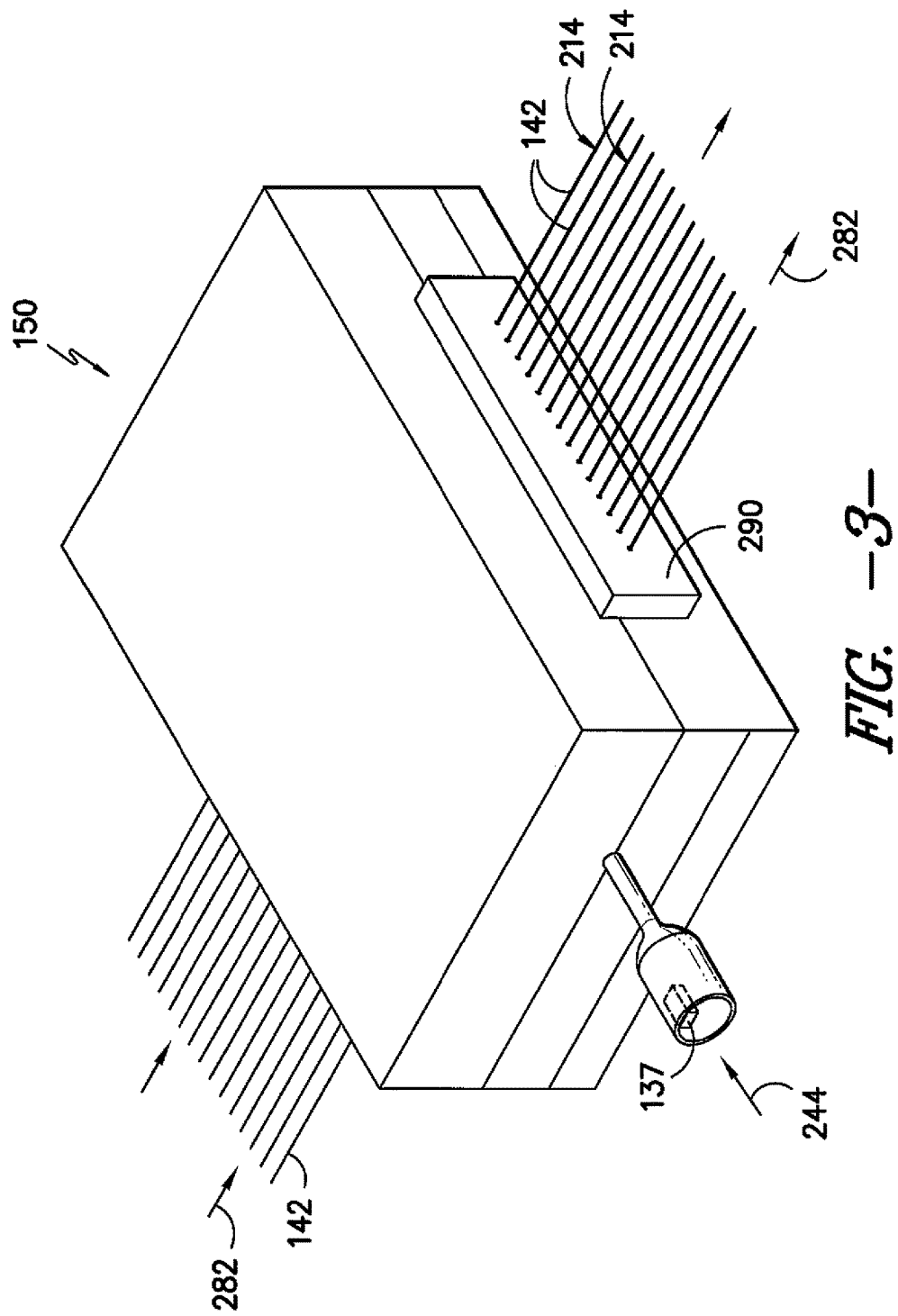
FIG. -3-

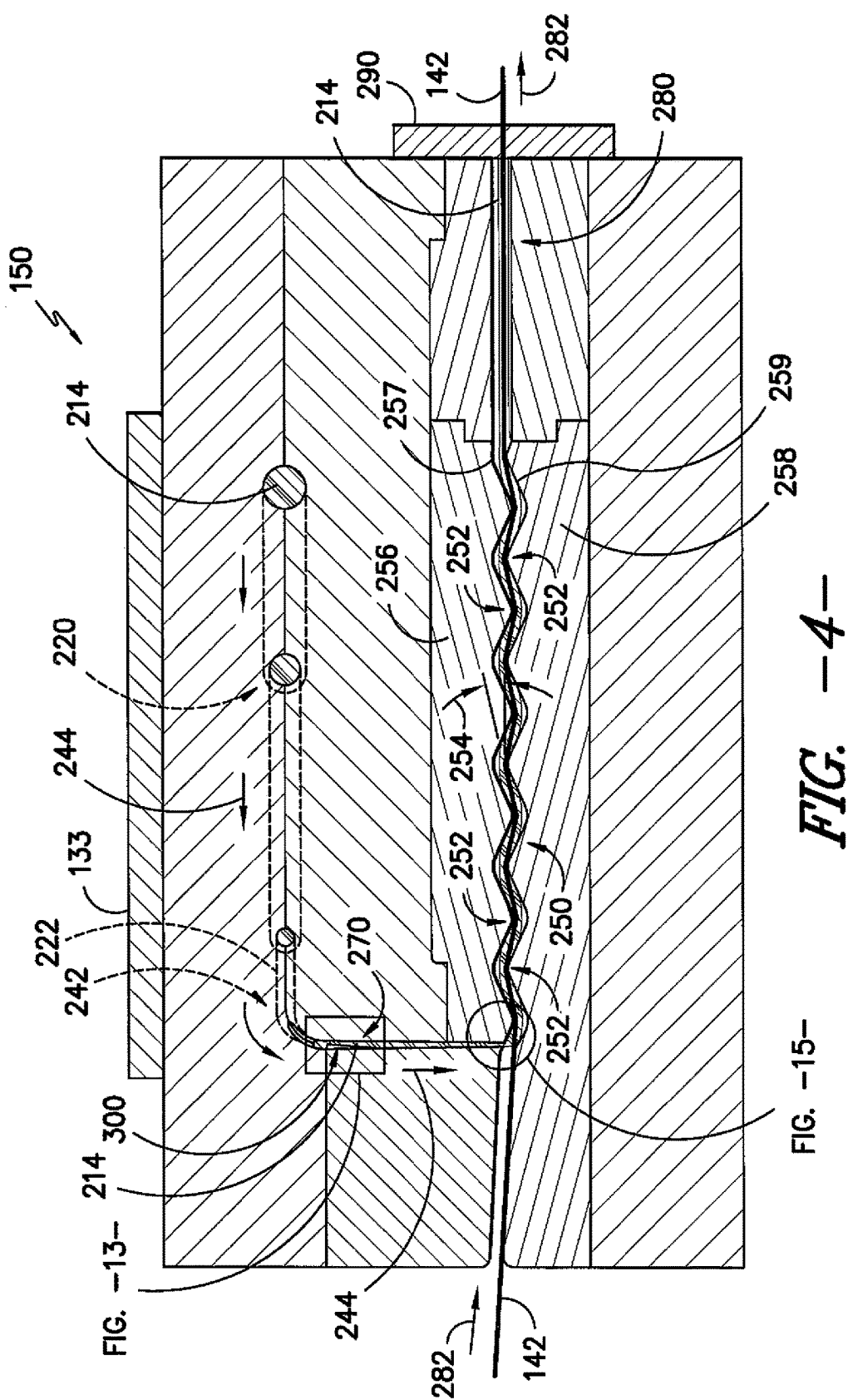

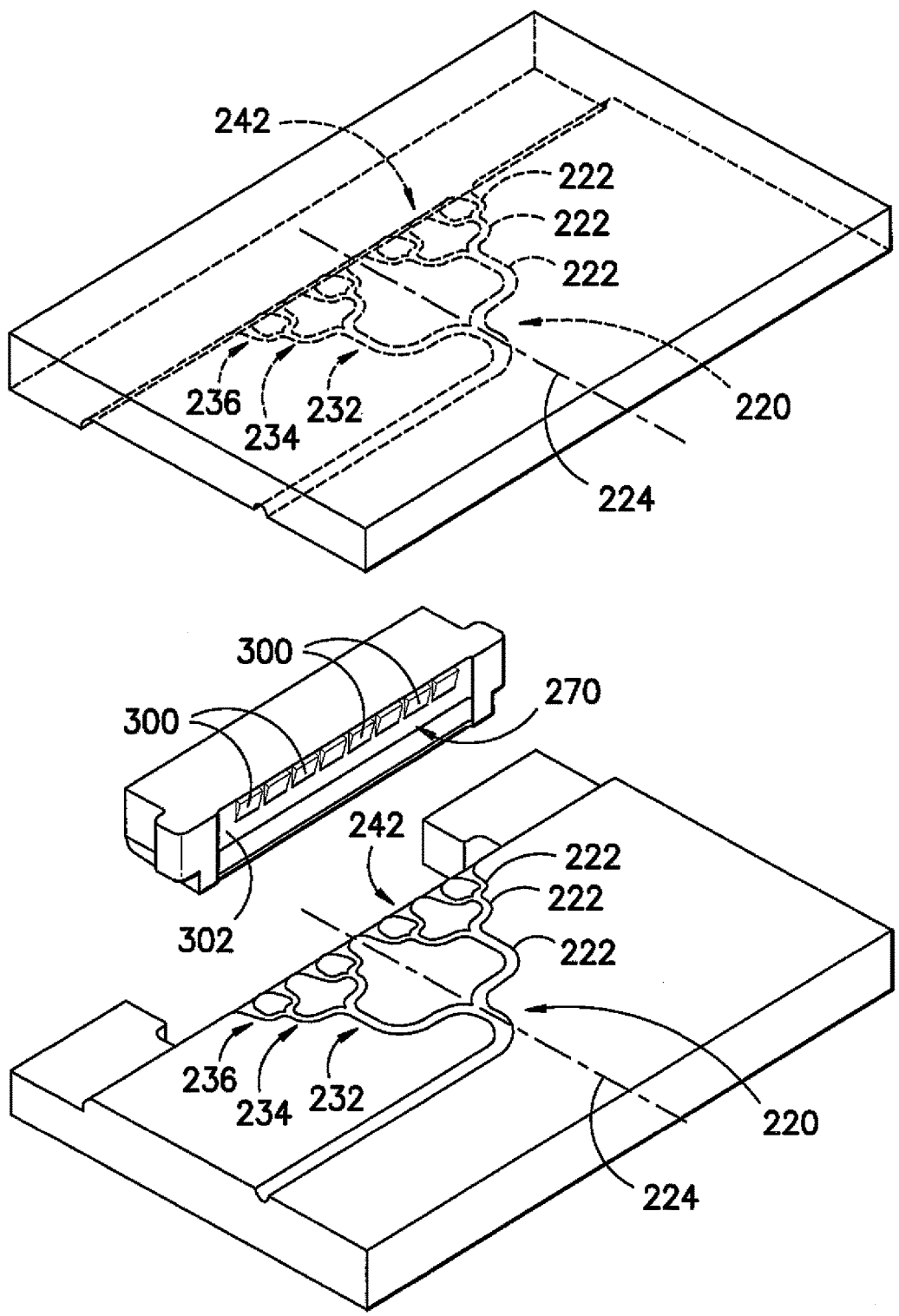
FIG. −5−

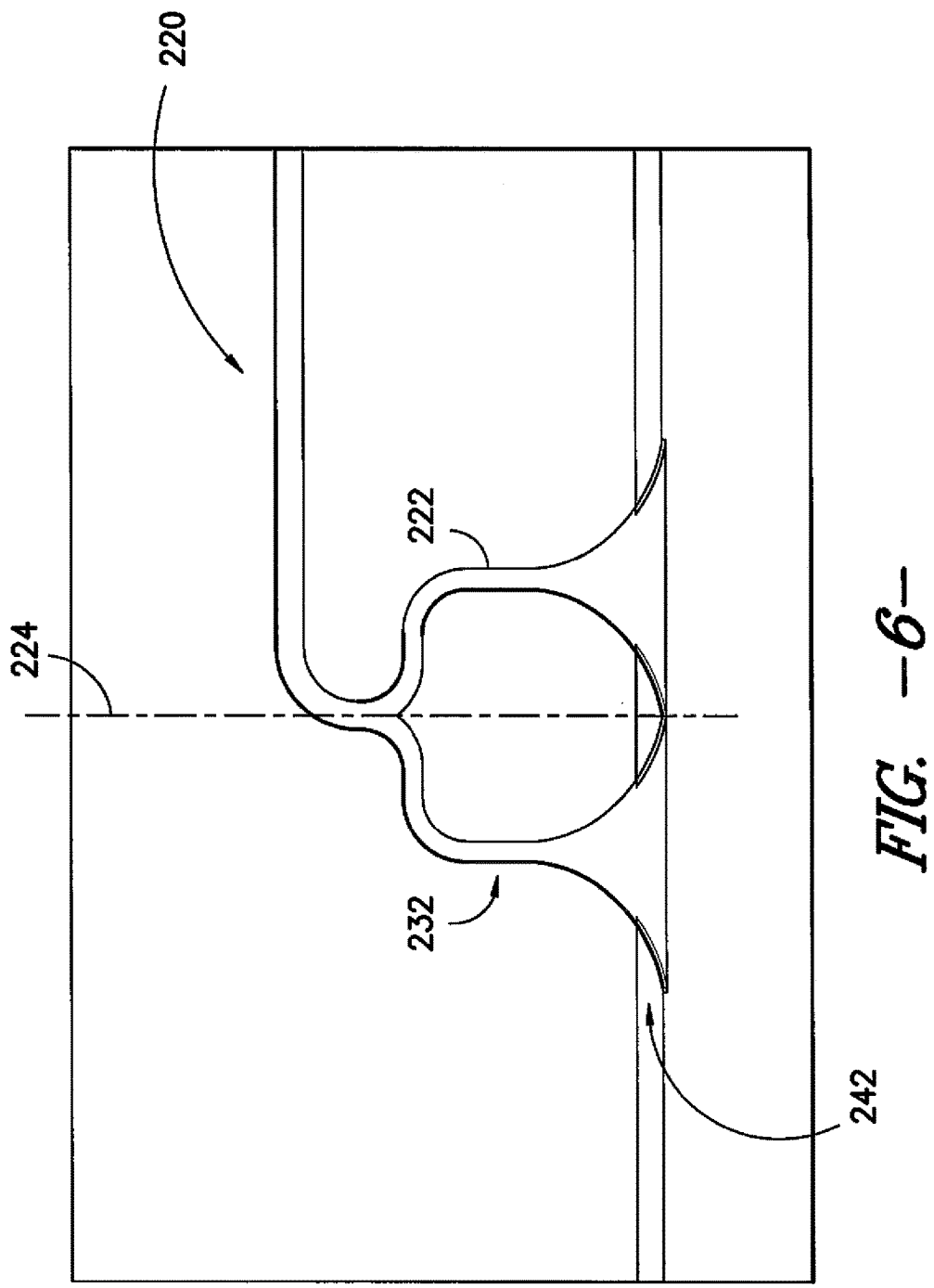

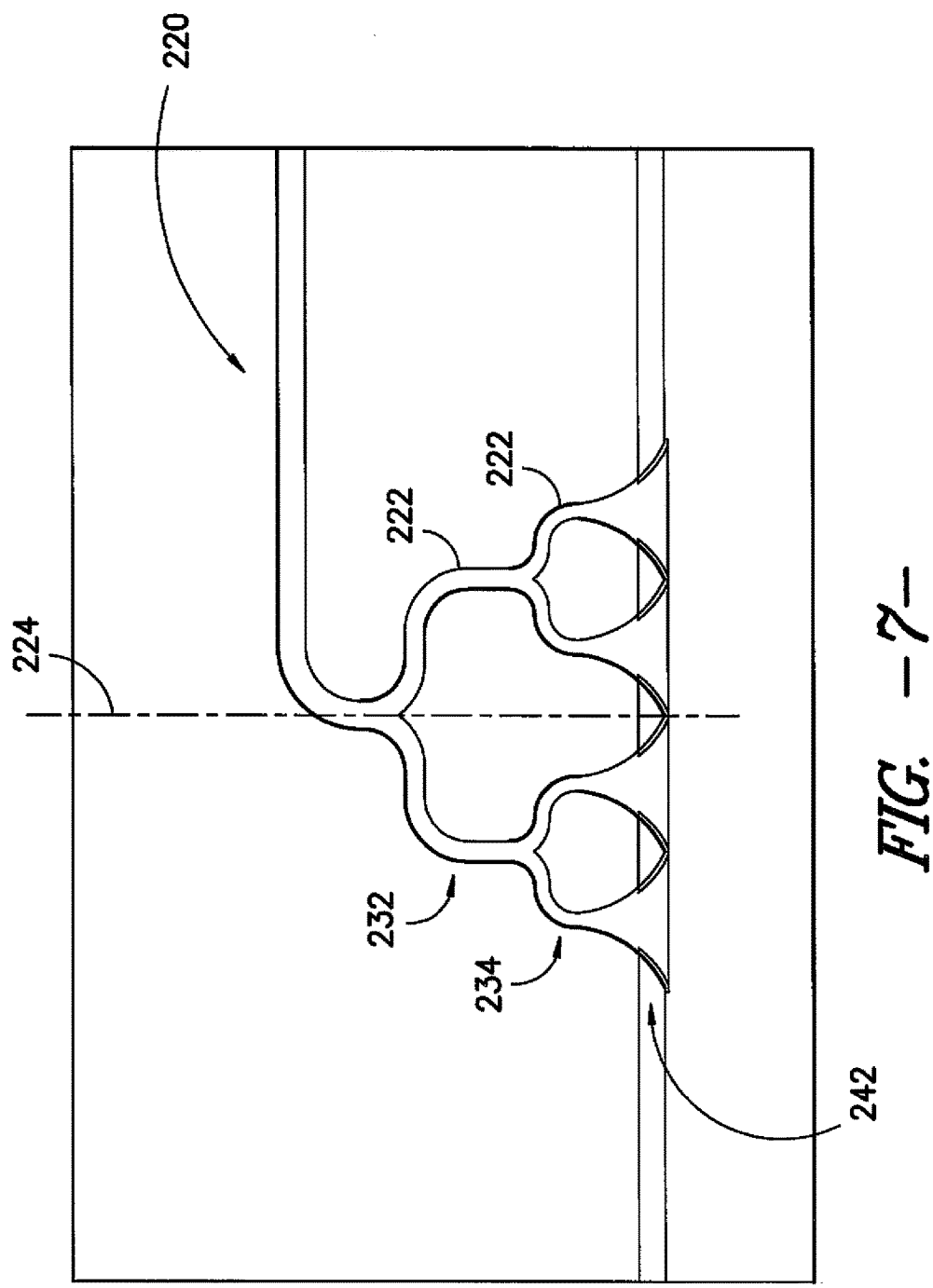

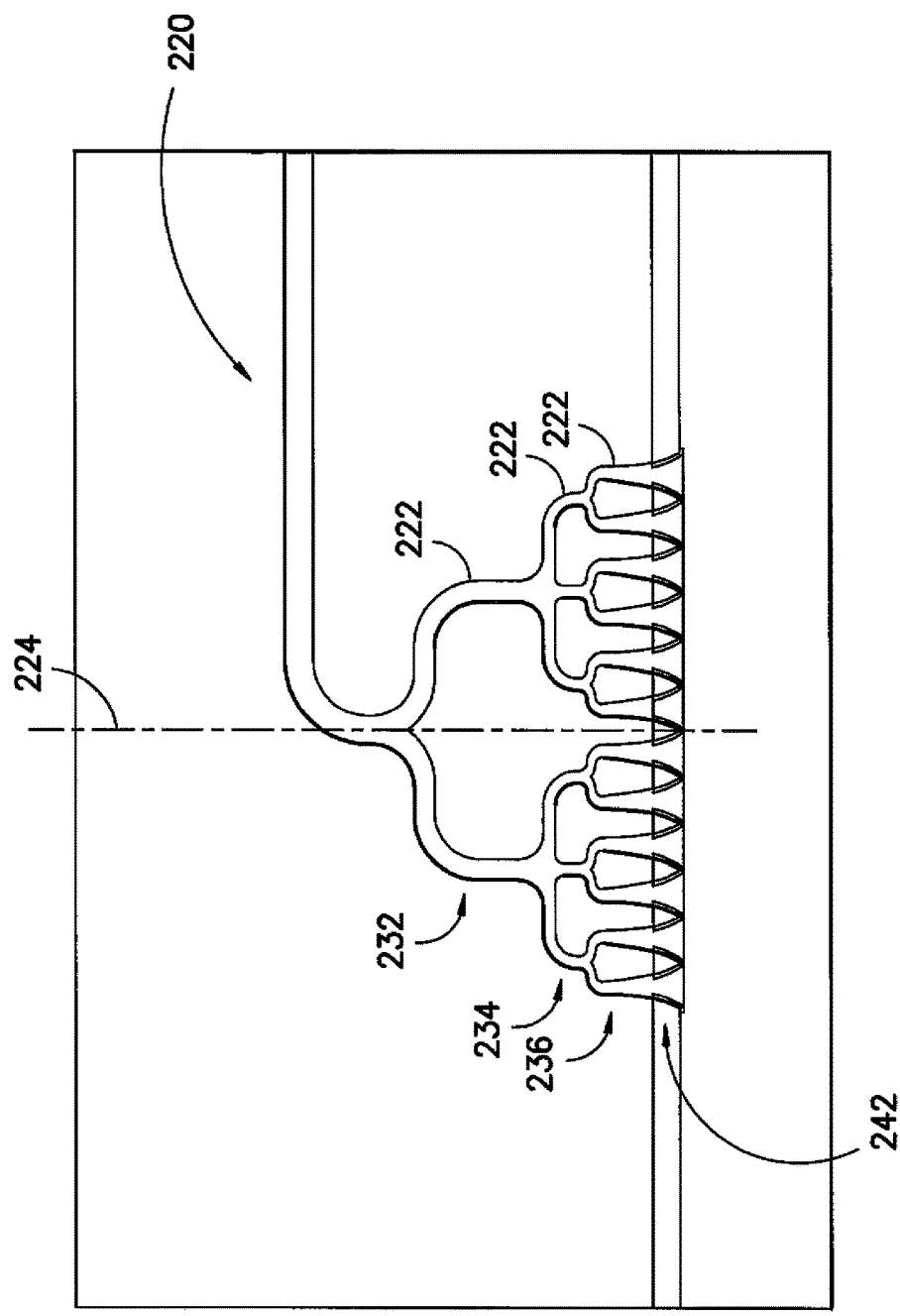
FIG. -8-

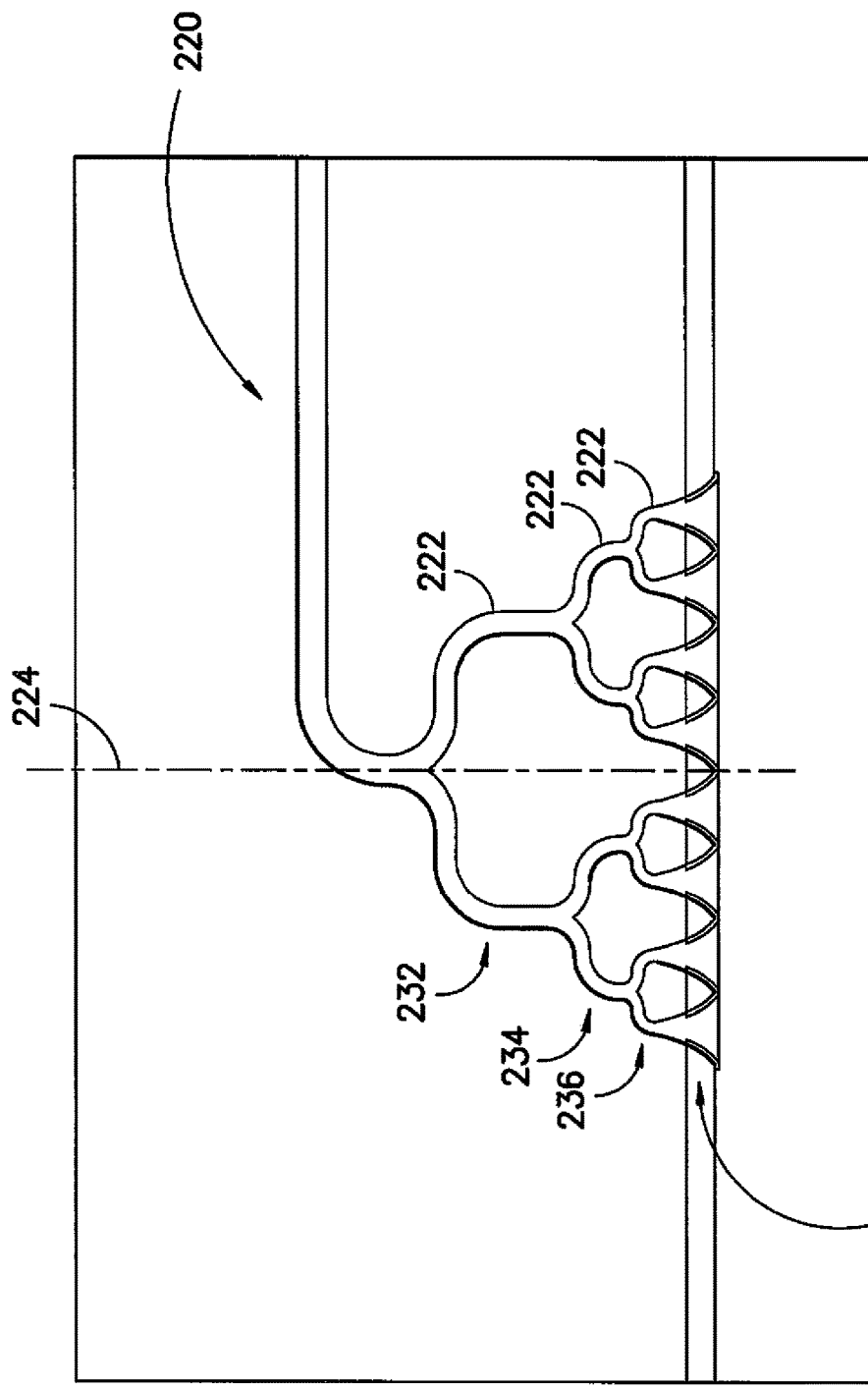
FIG. -9-

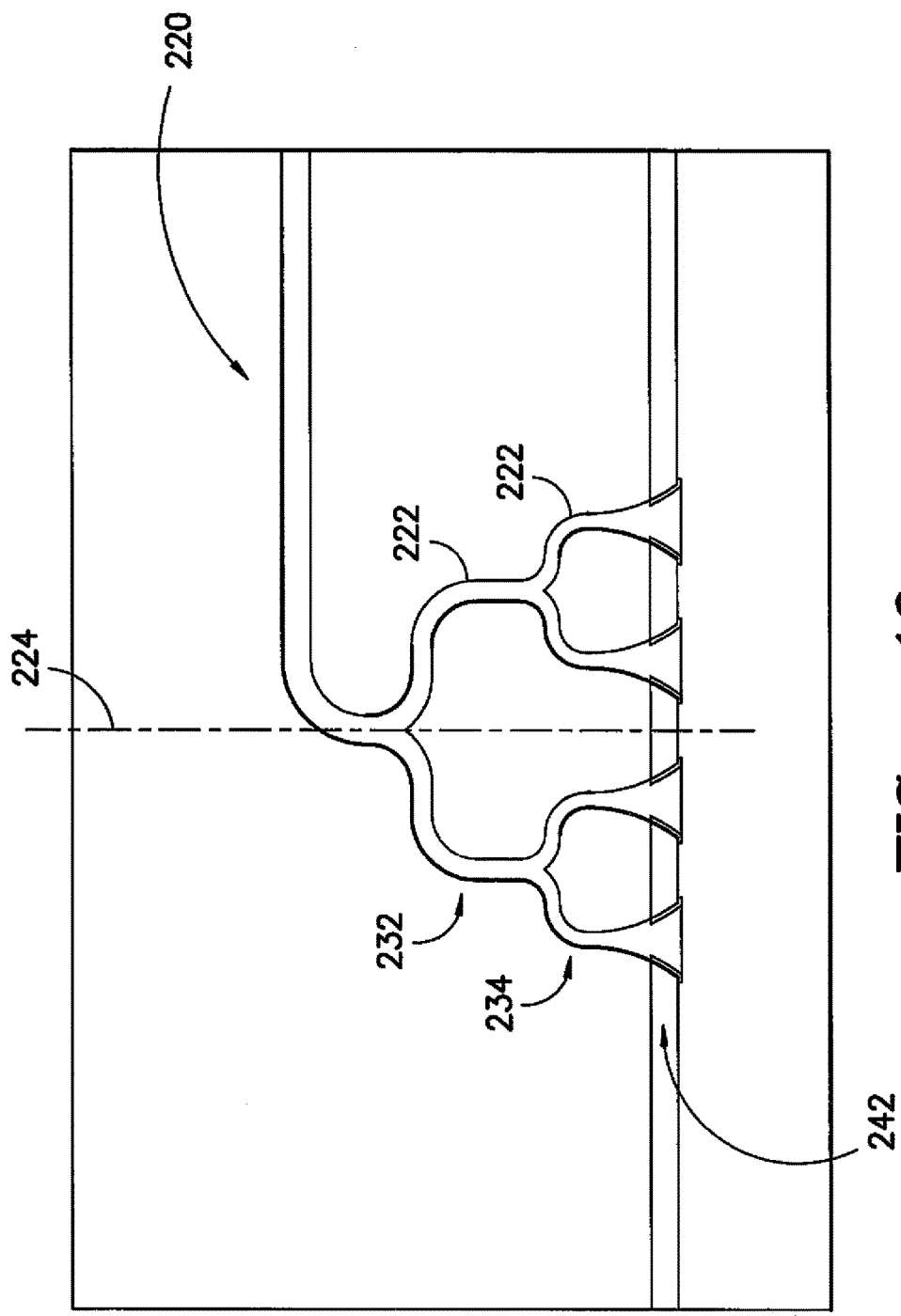

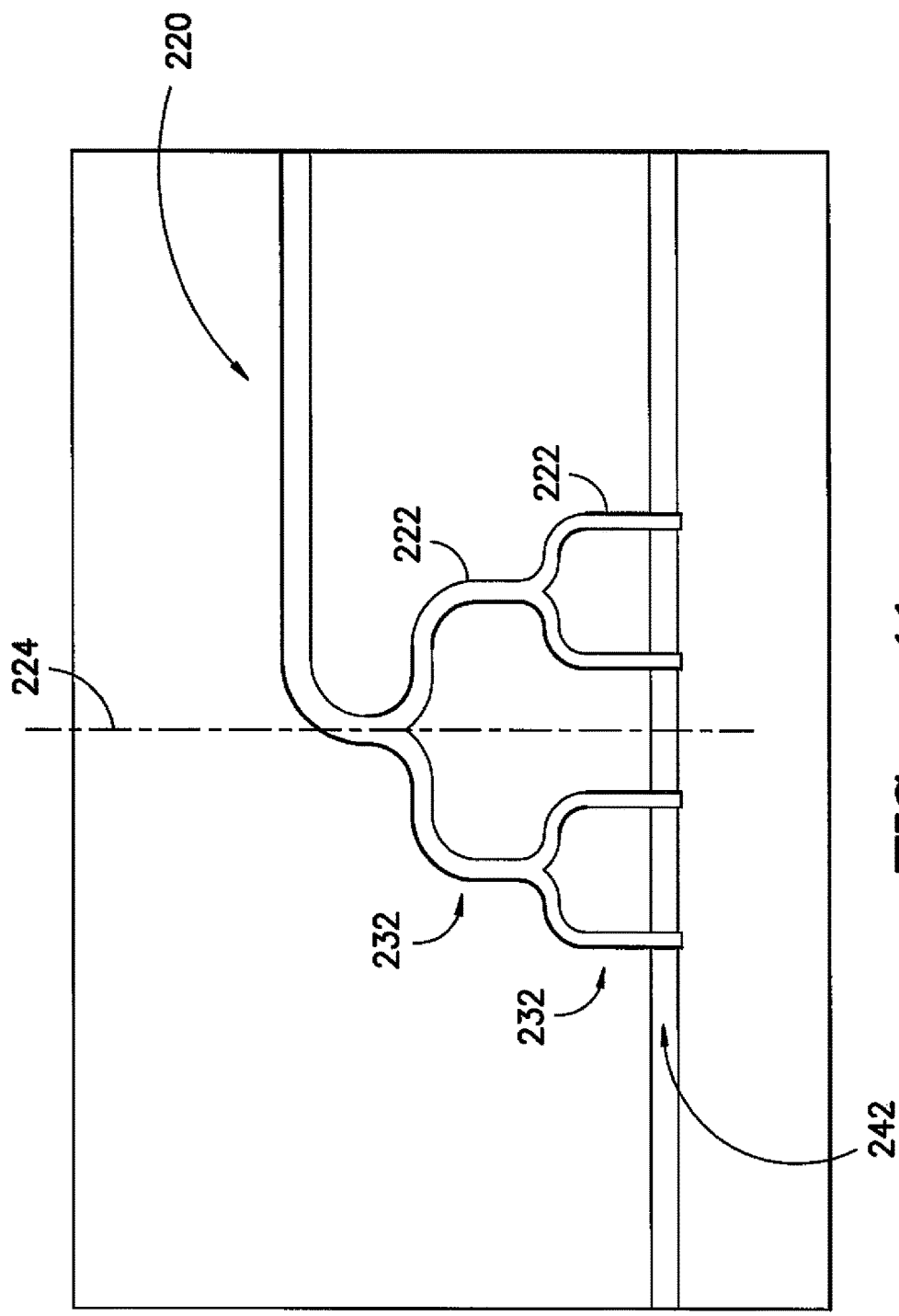

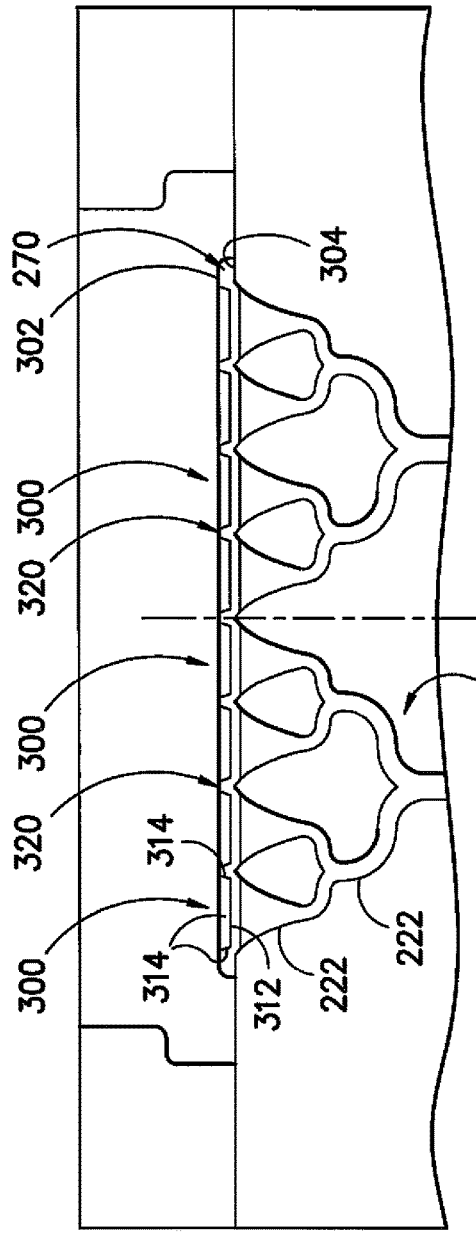
FIG. -12-
FIG. -13-

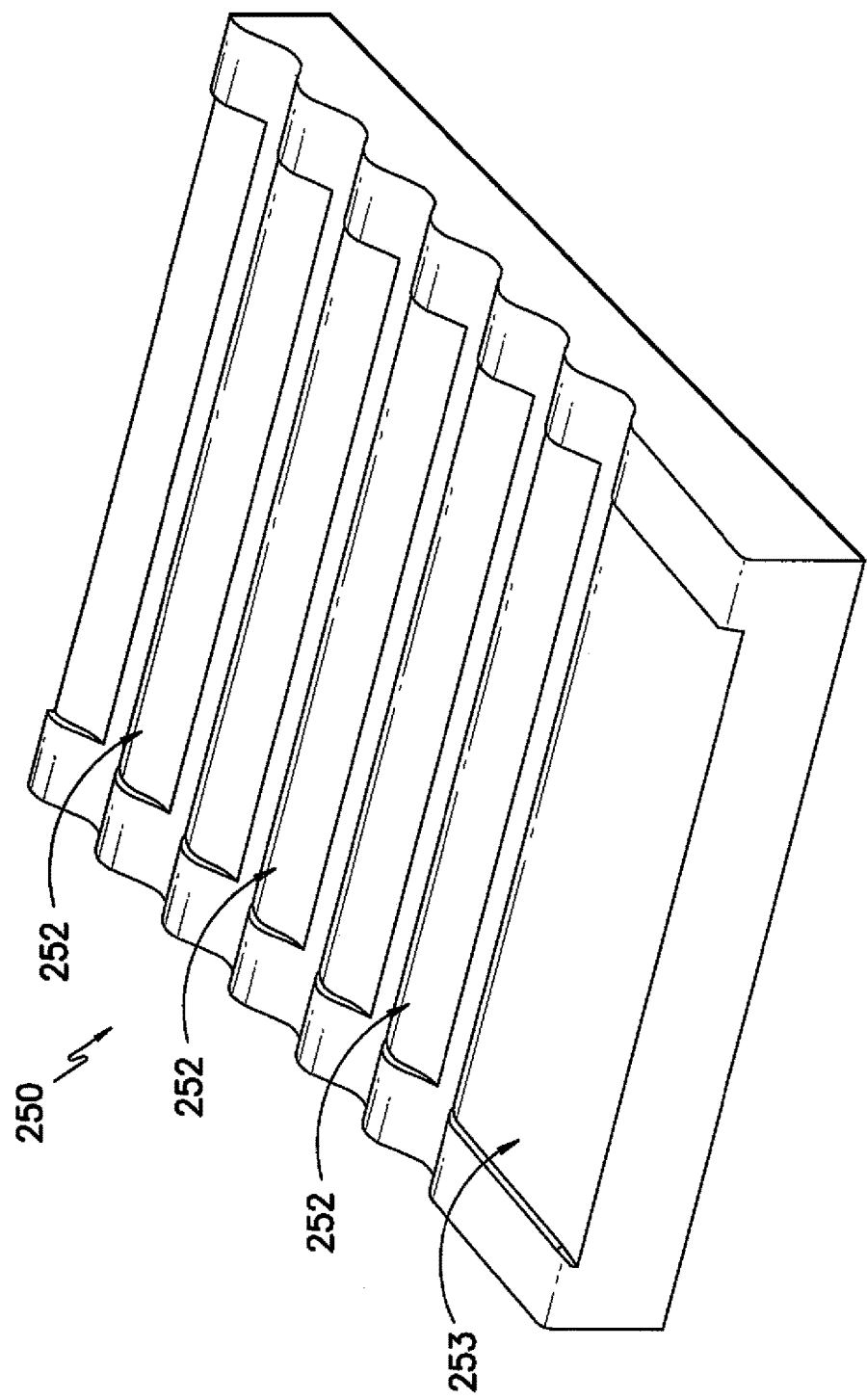

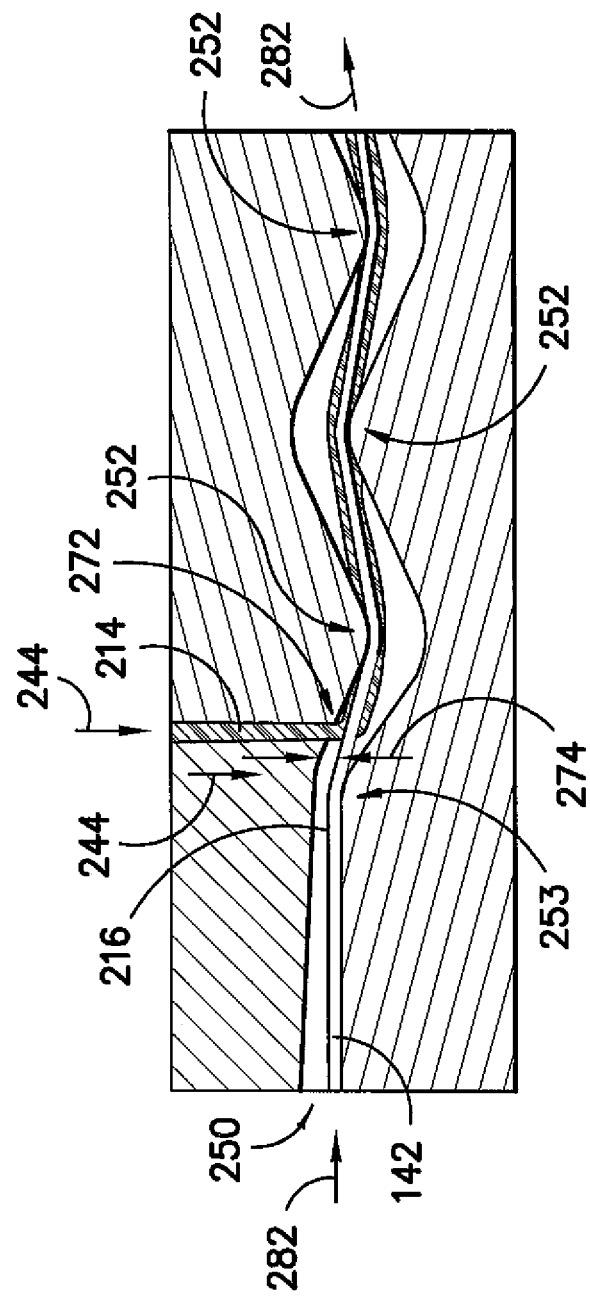
FIG. -15-

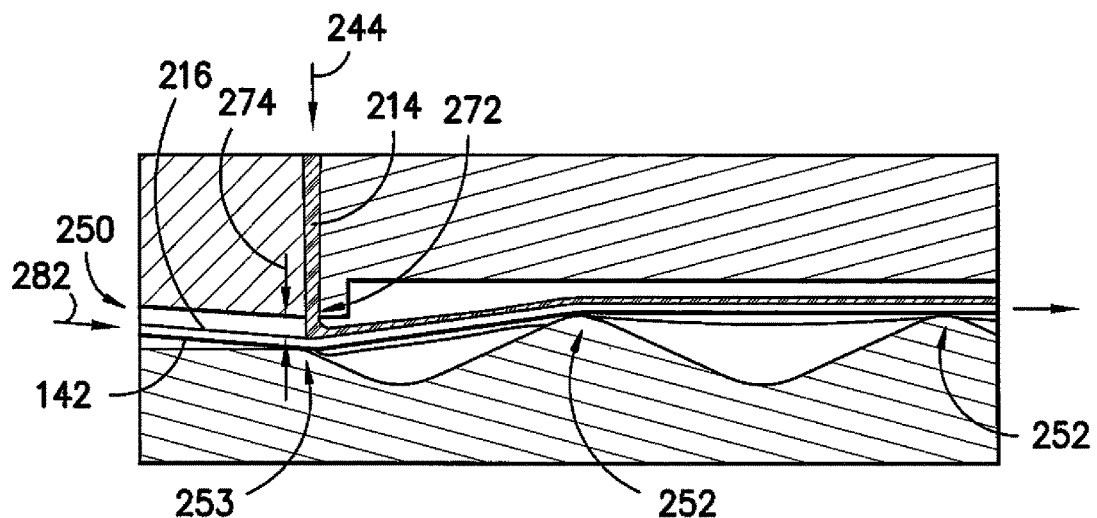
FIG. -16-
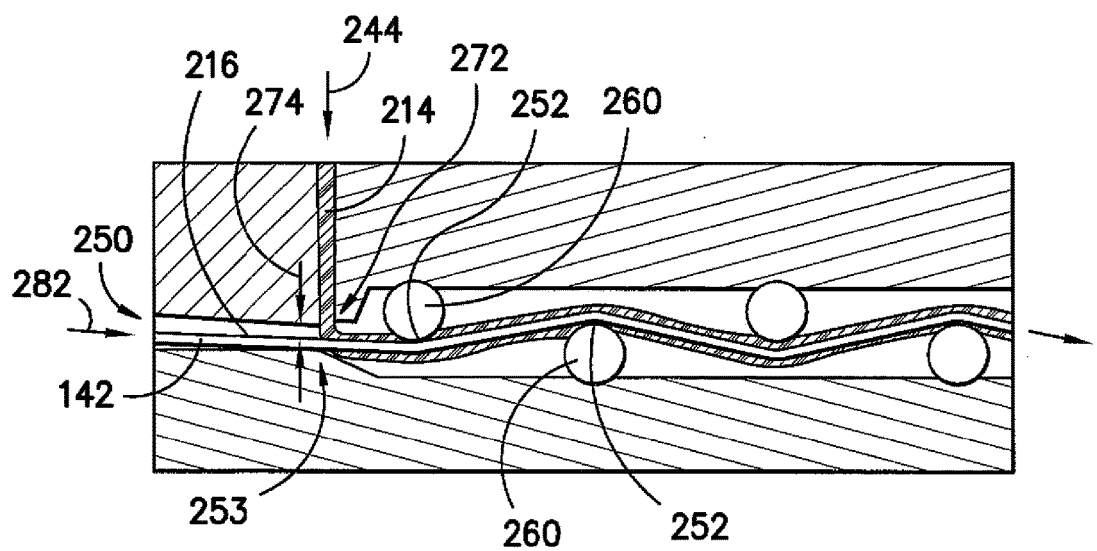
FIG. -17-

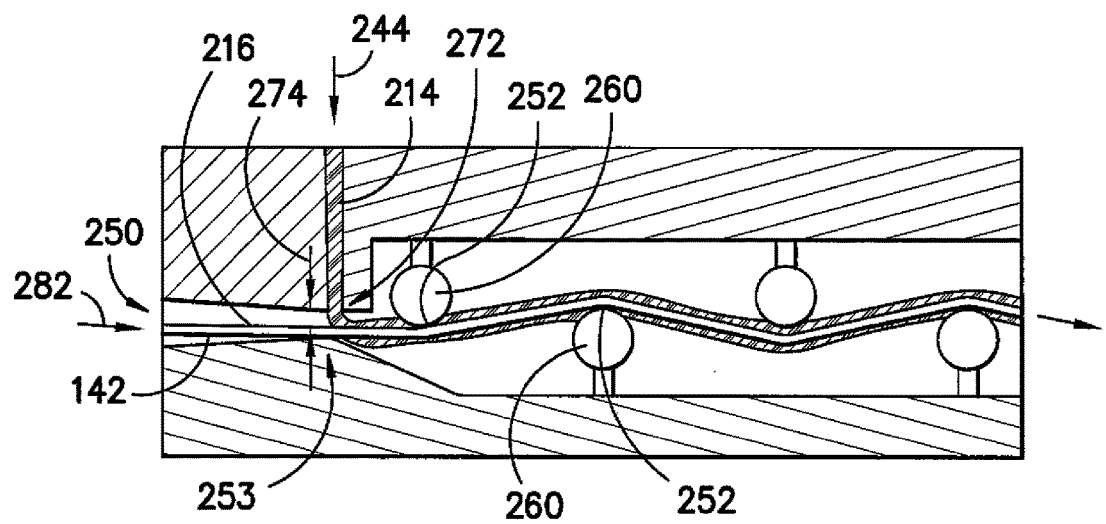
FIG. -18-
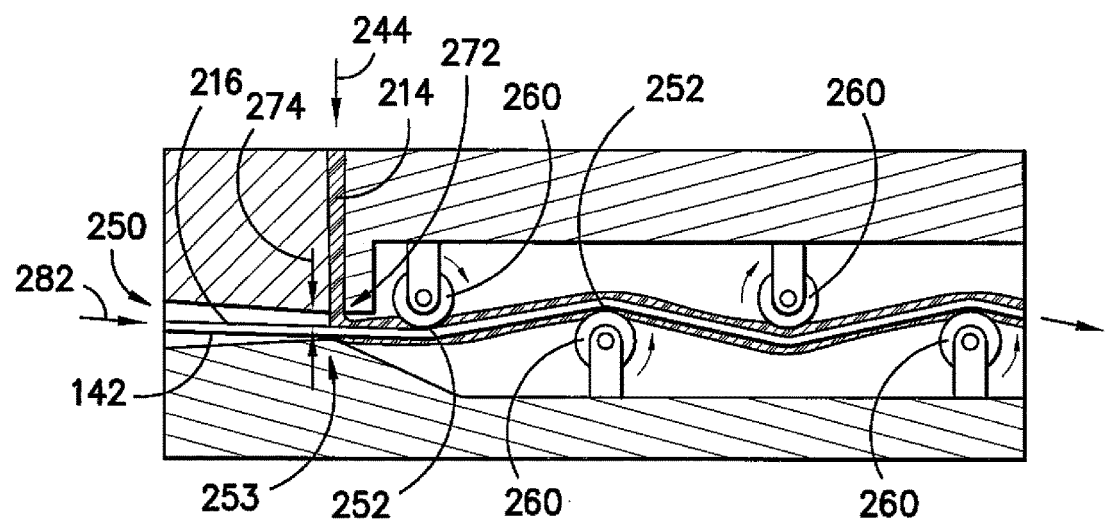
FIG. -19-

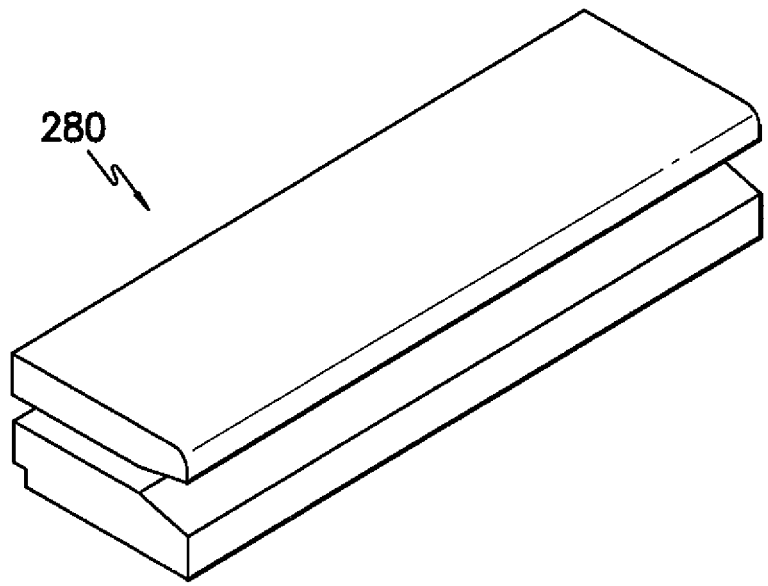
FIG. -20-
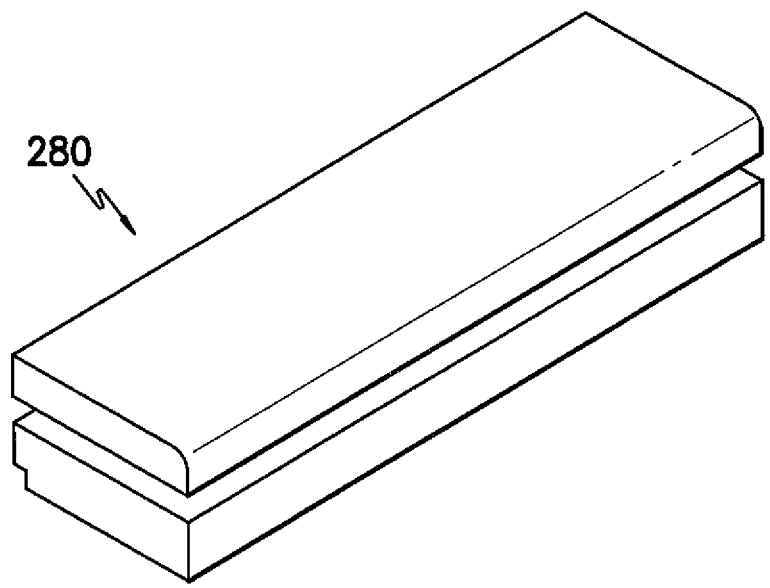
FIG. -21-

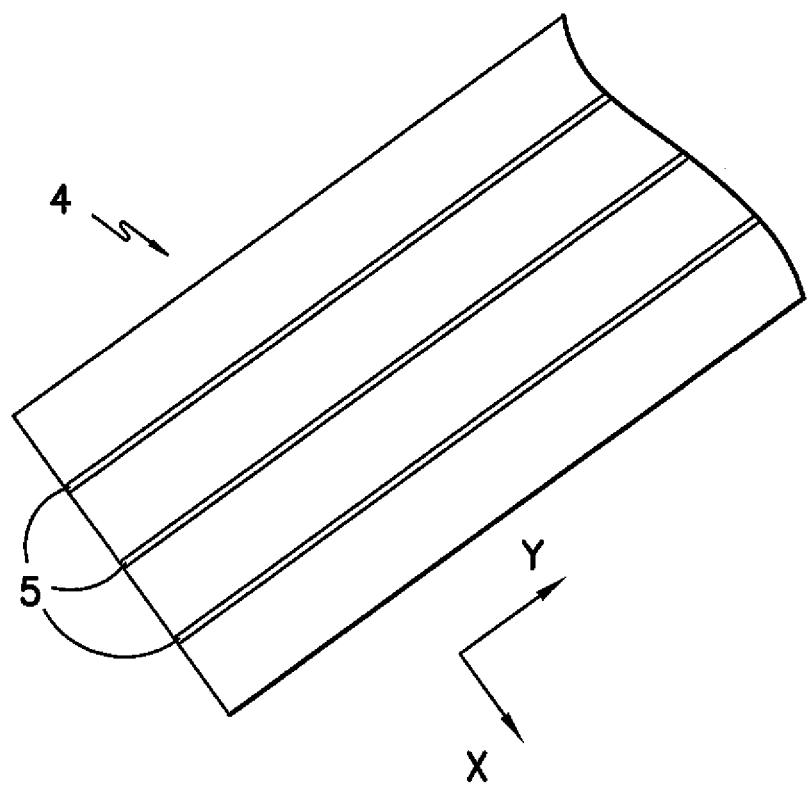
FIG. -22-
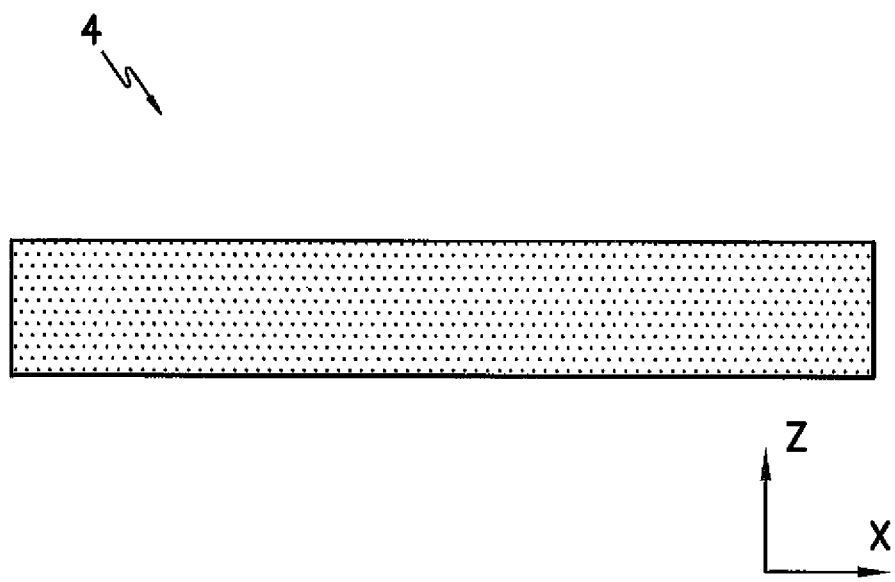
FIG. -23-

DIE WITH FLOW DIFFUSING GATE PASSAGE AND METHOD FOR IMPREGNATING SAME FIBER ROVINGS

RELATED APPLICATIONS

The present application claims priority to PCT International Application Serial No. PCT/US2012/035153 filed Apr. 26, 2012 and U.S. Provisional Application No. 61/480,501 filed Apr. 29, 2011 both of which are hereby incorporated by reference in their entirety.

This application claims the benefit of U.S. Provisional Application No. 61/480,501, filed Apr. 29, 2011, and which is hereby incorporated by reference.

BACKGROUND OF THE INVENTION

Fiber rovings have been employed in a wide variety of applications. For example, such rovings have been utilized to form fiber-reinforced composite rods. The rods may be utilized as lightweight structural reinforcements. For example, power umbilicals are often used in the transmission of fluids and/or electric signals between the sea surface and equipment located on the sea bed. To help strengthen such umbilicals, attempts have been made to use pultruded carbon fiber rods as separate load carrying elements.

Another application that is particularly suited for the use of fiber rovings is in the formation of profiles. Profiles are pultruded parts with a wide variety of cross-sectional shapes, and may be employed as a structural member for window lineals, decking planks, railings, balusters, roofing tiles, siding, trim boards, pipe, fencing, posts, light posts, highway signage, roadside marker posts, etc. Hollow profiles have been formed by pulling ("pultruding") continuous fiber rovings through a resin and then shaping the fiber-reinforced resin within a pultrusion die.

Further, fiber rovings may generally be utilized in any suitable applications to form, for example, suitable fiber reinforced plastics. As is generally known in the art, rovings utilized in these applications are typically combined with a polymer resin.

There are many significant problems, however, with currently known rovings and the resulting applications that utilize such rovings. For example, many rovings rely upon thermoset resins (e.g., vinyl esters) to help achieve desired strength properties. Thermoset resins are difficult to use during manufacturing and do not possess good bonding characteristics for forming layers with other materials. Further, attempts have been made to form rovings from thermoplastic polymers in other types of applications. U.S. Patent Publication No. 2005/0186410 to Bryant, et at, for instance, describes attempts that were made to embed carbon fibers into a thermoplastic resin to form a composite core of an electrical transmission cable. Unfortunately, Bryant, et al. notes that these cores exhibited flaws and dry spots due to inadequate wetting of the fibers, which resulted in poor durability and strength. Another problem with such cores is that the thermoplastic resins could not operate at a high temperature.

As such, a need currently exists for an improved die and method for impregnating a fiber roving. Specifically, a need currently exists for a die and method that produce fiber rovings which provide the desired strength, durability, and temperature performance demanded by a particular application.

SUMMARY OF THE INVENTION

In accordance with one embodiment of the present invention, a die is disclosed for impregnating at least one fiber roving with a polymer resin. The die includes a manifold assembly, an impregnation zone, and a gate passage. The manifold assembly flows the resin therethrough, and includes a channel. The impregnation zone is in fluid communication with the manifold assembly, and is configured to impregnate the roving with the resin. The gate passage is between the manifold assembly and the impregnation zone, and flows the resin from the manifold assembly such that the resin coats the roving. The gate passage includes a projection. The projection is configured to diffuse resin flowing through the gate passage.

In accordance with another embodiment of the present invention, a method is disclosed for impregnating at least one fiber roving with a polymer resin. The method includes flowing a polymer resin through a manifold assembly. The manifold assembly includes a channel. The method further includes flowing the polymer resin from the manifold assembly into a gate passage, and diffusing the polymer resin within the gate passage. Further, the method includes coating at least one fiber roving with the resin, and traversing the coated roving through an impregnation zone to impregnate the roving with the resin.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a schematic illustration of one embodiment of an impregnation system for use in the present invention;

FIG. 2 is a perspective view of one embodiment of a die for use in the present invention;

FIG. 3 is an opposing perspective view of one embodiment of a die for use in the present invention;

FIG. 4 is a cross-sectional view of the die shown in FIG. 2;

FIG. 5 is an exploded view of one embodiment of a manifold assembly and gate passage for a die that may be employed in the present invention;

FIG. 6 is a plan view of one embodiment of a manifold assembly that may be employed in the present invention;

FIG. 7 is a plan view of another embodiment of a manifold assembly that may be employed in the present invention;

FIG. 8 is a plan view of another embodiment of a manifold assembly that may be employed in the present invention;

FIG. 9 is a plan view of another embodiment of a manifold assembly that may be employed in the present invention;

FIG. 10 is a plan view of another embodiment of a manifold assembly that may be employed in the present invention;

FIG. 11 is a plan view of another embodiment of a manifold assembly that may be employed in the present invention;

FIG. 12 is a top view of a manifold assembly and gate passage that may be employed in the present invention;

FIG. 13 is a close-up cross-sectional view, as indicated in FIG. 4, of one embodiment of a portion of a gate passage that may be employed in the present invention;

FIG. 14 is a perspective view of one embodiment of a plate at least partially defining an impregnation zone that may be employed in the present invention;

FIG. 15 is a close-up cross-sectional view, as indicated in FIG. 4, of one embodiment of a portion of an impregnation zone that may be employed in the present invention;

FIG. 16 is a close-up cross-sectional view of another embodiment of a portion of an impregnation zone that may be employed in the present invention;

FIG. 17 is a close-up cross-sectional view of another embodiment of a portion of an impregnation zone that may be employed in the present invention;

FIG. 18 is a close-up cross-sectional view of another embodiment of a portion of an impregnation zone that may be employed in the present invention;

FIG. 19 is a close-up cross-sectional view of another embodiment of a portion of an impregnation zone that may be employed in the present invention;

FIG. 20 is a perspective view of one embodiment of a land zone that may be employed in the present invention;

FIG. 21 is a perspective view of another embodiment of a land zone that may be employed in the present invention;

FIG. 22 is a perspective view of one embodiment of a consolidated ribbon for use in the present invention; and FIG. 23 is a cross-sectional view of another embodiment of a consolidated ribbon for use in the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a die and method for impregnating fiber rovings with a polymer resin. The impregnated fiber rovings may be utilized in composite rods, profiles, or any other suitable fiber reinforced plastic applications. The die according to the present invention generally includes a manifold assembly, an impregnation zone, and a gate passage therebetween. The manifold assembly distributes a polymer resin therethrough. Upon exiting the manifold assembly, the resin flows into and through the gate passage. The gate passage includes at least one projection that extends into the gate passage and diffuses resin flowing through the gate passage. The rovings are traversed through the die such that the resin, upon exiting the gate passage, coats the rovings. After being coated with the resin, the ravings are traversed through the impregnation zone and impregnated therein with the resin.

Advantageously, the projections may promote generally uniform flow of the resin within the gate passage, such that the resin generally uniformly coats the rovings. Further, by diffusing the resin within the gate passage, the projections may increase the velocity of the resin in the manifold assembly, and may reduce or prevent scalloping and other non-uniform flow patterns in the resin within and exiting the gate passage.

According to further aspects of the present invention, an extrusion device may be employed in conjunction with the die to impregnate the rovings with the polymer. Among other things, the extrusion device further facilitates the ability of the polymer to be applied to the entire surface of the fibers, as discussed below.

Referring to FIG. 1, one embodiment of such an extrusion device is shown. More particularly, the apparatus includes an extruder 120 containing a screw shaft 124 mounted inside a barrel 122. A heater 130 (e.g., electrical resistance heater) is mounted outside the barrel 122. During use, a polymer feedstock 127 is supplied to the extruder 120 through a hopper 126. The feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 may be supplied from a reel or reels 144 to die 150. The rovings 142 may be spread apart before being supplied for impregnation, and may be supplied vertically, horizontally, or at any suitable angle. After being supplied, the rovings 142 may be generally positioned side-by-side, with minimal to no distance between neighboring rovings, before impregnation. The feedstock 127 may further be heated inside the die by heaters 133 mounted in or around the die 150. The die is generally operated at temperatures that are sufficient to cause and/or maintain the proper melt temperature for the polymer, thus allowing for the desired level of impregnation of the rovings by the polymer. Typically, the operation temperature of the die is higher than the melt temperature of the polymer, such as at temperatures from about 200° C. to about 450° C. When processed in this manner, the continuous fiber rovings 142 become embedded in the polymer matrix, which may be a resin 214 (FIG. 4) processed from the feedstock 127. The mixture may then exit the impregnation die 150 as wetted composite or extrudate 152.

As used herein, the term "roving" generally refers to a bundle of individual fibers. The fibers contained within the roving can be twisted or can be straight. The rovings may contain a single fiber type or different types of fibers. Different fibers may also be contained in individual rovings or, alternatively, each roving may contain a different fiber type. The continuous fibers employed in the rovings possess a high degree of tensile strength relative to their mass. For example, the ultimate tensile strength of the fibers is typically from about 1,000 to about 15,000 Megapascals ("MPa"), in some embodiments from about 2,000 MPa to about 10,000 MPa, and in some embodiments, from about 3,000 MPa to about 6,000 MPa. Such tensile strengths may be achieved even though the fibers are of a relatively light weight, such as a mass per unit length of from about 0.05 to about 2 grams per meter, in some embodiments from about 0.4 to about 1.5 grams per meter. The ratio of tensile strength to mass per unit length may thus be about 1,000 Megapascals per gram per meter ("MPa/g/m") or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E. I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic and/or thermoset compositions. Carbon fibers are particularly suitable for use as the continuous fibers, which typically have a tensile strength to mass ratio in the range of from about 5,000 to about 7,000 MPa/g/m. The continuous fibers often have a nominal diameter of about 4 to about 35 micrometers, and in some embodiments, from about 9 to about 35 micrometers. The number of fibers contained in each roving can be constant or vary from roving to roving. Typically, a roving contains from about 1,000 fibers to about 50,000 individual fibers, and in some embodiments, from about 5,000 to about 30,000 fibers.

Any of a variety of thermoplastic or thermoset polymers may be employed to form the polymer matrix in which the continuous fibers are embedded. For example, suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., Nylon™), polyether ketones (e.g., polyetherether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

The properties of the polymer matrix are generally selected to achieve the desired combination of processability and performance. For example, the melt viscosity of the polymer matrix is generally low enough so that the polymer can adequately impregnate the fibers. In this regard, the melt viscosity typically ranges from about 25 to about 1,000 Pascal-seconds ("Pa-s"), in some embodiments from 50 about 500 Pa-s, and in some embodiments, from about 60 to about 200 Pa-s, determined at the operating conditions used for the polymer (e.g., about 360° C.). Likewise, when the impregnated rovings are intended for applications involving high temperatures (e.g., high voltage transmission cables), a polymer is employed that has a relatively high melting temperature. For example, the melting temperature of such high temperature polymers may range from about 200° C. to about 500° C., in some embodiments from about 225° C. to about 400° C., and in some embodiments, from about 250° C. to about 350° C.

Polyarylene sulfides are particularly suitable for use in the present invention as a high temperature matrix with the desired melt viscosity. Polyphenylene sulfide, for example, is a semi-crystalline resin that generally includes repeating monomeric units represented by the following general formula:

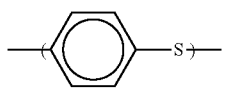

These monomeric units typically constitute at least 80 mole %, and in some embodiments, at least 90 mole %, of the recurring units, in the polymer. It should be understood, however, the polyphenylene sulfide may contain additional recurring units, such as described in U.S. Pat. No. 5,075,381 to Gotoh, et al., which is incorporated herein in its entirety by reference thereto for all purposes. When employed, such additional recurring units typically constitute no more than about 20 mole % of the polymer. Commercially available high melt viscosity polyphenylene sulfides may include those available from Ticona, LLC (Florence, Ky.) under the trade designation FORTRON®. Such polymers may have a melting temperature of about 285° C. (determined according to ISO 11357-1,2,3) and a melt viscosity of from about 260 to about 320 Pascal-seconds at 310° C.

A pressure sensor 137 (FIGS. 2 and 3) may sense the pressure near the impregnation die 150 to allow control to be exerted over the rate of extrusion by controlling the rotational speed of the screw shaft 124, or the feed rate of the feeder. That is, the pressure sensor 137 is positioned near the impregnation die 150, such as upstream of the manifold assembly 220, so that the extruder 120 can be operated to deliver a correct amount of resin 214 for interaction with the fiber rovings 142. After leaving the impregnation die 150, the extrudate 152, or impregnated fiber rovings 142, may enter an optional pre-shaping or guiding section (not shown) before entering a nip formed between two adjacent rollers 190. Although optional, the rollers 190 can help to consolidate the extrudate 152 into the form of a ribbon, as well as enhance fiber impregnation and squeeze out any excess voids. Alternatively, the extrudate 152 may be in the form of a consolidated ribbon directly upon exiting the die 150. In addition to the rollers 190, other shaping devices may also be employed, such as a die system. Regardless, the resulting consolidated ribbon 156 is pulled by tracks 162 and 164 mounted on rollers. The tracks 162 and 164 also pull the extrudate 152 from the impregnation die 150 and through the rollers 190. If desired, the consolidated ribbon 156 may be wound up at a section 171. Generally speaking, the resulting ribbons are relatively thin and typically have a thickness of from about 0.05 to about 1 millimeter, in some embodiments from about 0.1 to about 0.8 millimeters, and in some embodiments, from about 0.2 to about 0.4 millimeters.

Perspective views of one embodiment of a die 150 according to the present disclosure are further shown in FIGS. 2 and 3. As shown, resin 214 is flowed into the die 150 as indicated by resin flow direction 244. The resin 214 is distributed within the die 150 and then interacted with the rovings 142. The ravings 142 are traversed through the die 150 in roving run direction 282, and are coated with resin 214. The rovings 142 are then impregnated with the resin 214, and these impregnated rovings 142 exit the die 150.

Within the impregnation die, it is generally desired that the ravings 142 are traversed through an impregnation zone 250 to impregnate the rovings with the polymer resin 214. In the impregnation zone 250, the polymer resin may be forced generally transversely through the ravings by shear and pressure created in the impregnation zone 250, which significantly enhances the degree of impregnation. This is particularly useful when forming a composite from ribbons of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, pin, etc. The contact surfaces 252 are also typically made of a metal material.

FIG. 4 shows a cross-sectional view of an impregnation die 150. As shown, the impregnation die 150 includes a manifold assembly 220, a gate passage 270, and an impregnation zone 250. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

As shown in FIGS. 5 through 11, in exemplary embodiments, at least a portion of each of the channels 222 may be curvilinear. The curvilinear portions may allow for relatively smooth redirection of the resin 214 in various directions to distribute the resin 214 through the manifold assembly 220, and may allow for relatively smooth flow of the resin 214 through the channels 222. Alternatively, the channels 222 may be linear, and redirection of the resin 214 may be through relatively sharp transition areas between linear portions of the channels 222. It should further be understood that the channels 222 may have any suitable shape, size, and/or contour.

The plurality of channels 222 may, in exemplary embodiments as shown in FIGS. 5 through 11, be a plurality of branched runners 222. The runners 222 may include a first branched runner group 232. The first branched runner group 232 includes a plurality of runners 222 branching off from an initial channel or channels 222 that provide the resin 214 to the manifold assembly 220. The first branched runner group 232 may include 2, 3, 4 or more runners 222 branching off from the initial channels 222.

If desired, the runners 222 may include a second branched runner group 234 diverging from the first branched runner group 232, as shown in FIGS. 5 and 7 through 11. For example, a plurality of runners 222 from the second branched runner group 234 may branch off from one or more of the runners 222 in the first branched runner group 232. The second branched runner group 234 may include 2, 3, 4 or more runners 222 branching off from runners 222 in the first branched runner group 232.

If desired, the runners 222 may include a third branched runner group 236 diverging from the second branched runner group 234, as shown in FIGS. 5 and 8 through 9. For example, a plurality of runners 222 from the third branched runner group 236 may branch off from one or more of the runners 222 in the second branched runner group 234. The third branched runner group 236 may include 2, 3, 4 or more runners 222 branching off from runners 222 in the second branched runner group 234.

In some exemplary embodiments, as shown in FIGS. 5 through 11, the plurality of branched runners 222 have a symmetrical orientation along a central axis 224. The branched runners 222 and the symmetrical orientation thereof generally evenly distribute the resin 214, such that the flow of resin 214 exiting the manifold assembly 220 and coating the ravings 142 is substantially uniformly distributed on the rovings 142. This desirably allows for generally uniform impregnation of the rovings 142.

Further, the manifold assembly 220 may in some embodiments define an outlet region 242. The outlet region 242 is that portion of the manifold assembly 220 wherein resin 214 exits the manifold assembly 220. Thus, the outlet region 242 generally encompasses at least a downstream portion of the channels or runners 222 from which the resin 214 exits. In some embodiments, as shown in FIGS. 5 through 10, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142. Additionally or alternatively, various channels or runners 222 disposed in the outlet region 242 may have constant areas in the flow direction 244 of the resin 214, as shown in FIG. 11, or may have decreasing areas in the flow direction 244 of the resin 214.

In some embodiments, as shown in FIGS. 5 through 9, each of the channels or runners 222 disposed in the outlet region 242 is positioned such that resin 214 flowing therefrom is combined with resin 214 from other channels or runners 222 disposed in the outlet region 242. This combination of the resin 214 from the various channels or runners 222 disposed in the outlet region 242 produces a generally singular and uniformly distributed flow of resin 214 from the manifold assembly 220 to substantially uniformly coat the rovings 142. Alternatively, as shown in FIGS. 10 and 11, various of the channels or runners 222 disposed in the outlet region 242 may be positioned such that resin 214 flowing therefrom is discrete from the resin 214 from other channels or runners 222 disposed in the outlet region 242. In these embodiments, a plurality of discrete but generally evenly distributed resin flows 214 may be produced by the manifold assembly 220 for substantially uniformly coating the rovings 142.

As shown in FIG. 4, at least a portion of the channels or runners 222 disposed in the outlet region 242 have curvilinear cross-sectional profiles. These curvilinear profiles allow for the resin 214 to be gradually directed from the channels or runners 222 generally downward towards the rovings 142. Alternatively, however, these channels or runners 222 may have any suitable cross-sectional profiles.

As further illustrated in FIGS. 4, 5, 12 and 13, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the ravings 142. Thus, resin 214 exiting the manifold assembly 220, such as through outlet region 242, may enter gate passage 270 and flow therethrough.

In some embodiments, as shown in FIGS. 4 and 13, the gate passage 270 extends vertically between the manifold assembly 220 and the impregnation zone 250. Alternatively, however, the gate passage 270 may extend at any suitable angle between vertical and horizontal such that resin 214 is allowed to flow therethrough.

Further, as shown in FIGS. 4 and 13, in some embodiments at least a portion of the gate passage 270 has a decreasing cross-sectional profile in the flow direction 244 of the resin 214. This taper of at least a portion of the gate passage 270 may increase the flow rate of the resin 214 flowing therethrough before it contacts the rovings 142, which may allow the resin 214 to impinge on the rovings 142. Initial impingement of the rovings 142 by the resin 214 provides for further impregnation of the ravings, as discussed below. Further, tapering of at least a portion of the gate passage 270 may increase backpressure in the gate passage 270 and the manifold assembly 220, which may further provide more even, uniform distribution of the resin 214 to coat the rovings 142. Alternatively, the gate passage 270 may have an increasing or generally constant cross-sectional profile, as desired or required.

As further shown in FIGS. 4, 5, 12 and 13, the gate passage 270 includes at least one projection 300. Each projection 300 extends from an inner wall defining the gate passage 270, such as inner wall 302 or inner wall 304 as shown in FIGS. 5, 12, and 13. Further, each projection 300 is configured to diffuse resin 214 flowing through the gate passage 270. For example, resin 214 flowed into the gate passage 270 may be flowed over a projection 300. The projection 300 diffuses this resin 214 by spreading it generally transversely with respect to flow direction 244 of the resin 214 as it flows through the gate passage 270, thus enhancing the uniform distribution of the resin 214 within the gate passage 270.

In exemplary embodiments, each projection 300 may correspond to one of the plurality of channels 222 in the manifold assembly 220, such as to one of the plurality of channels 222 in outlet region 242. In these embodiments, resin 214 exhausted from each channel 222 into the gate passage 270 may contact the corresponding projection 300 and be generally uniformly diffused by this projection 300 within the gate passage 270.

As discussed, each projection 300 extends from an inner wall that defines the gate passage 270. The projections 300 may have any suitable shape and/or size. For example, in some exemplary embodiments as shown in FIGS. 4, 5, 12, and 13, a projection 300 includes an outer surface 312 and at least one side surface 314 or a plurality of side surfaces 314. The side surfaces 314 may define at least a portion of the periphery of the projection 300, and may extend between an inner wall and the outer surface 312. Each of the outer surface 312 and side surfaces 314 may be generally planer, or may be a generally curved surface. In other embodiments, however, a projection may be generally conical, spherical, cylindrical, pyramid-like, prism-like, or have any other suitable three-dimensional, polygonal shape.

In some embodiments, as shown in FIG. 12, a side surface 314 may be tapered between the inner wall of the gate passage 270 and the outer surface 312. For example, in exemplary embodiments, a side surface 314, or a portion thereof, tapers towards the outer surface 312. It should be understood, however, that a side surface 314 or portion thereof may alternatively taper away from the outer surface 312 or be generally constant with no taper.

Further, as shown in FIG. 13, a side surface 314 may extend from an inner wall, such as inner wall 302, at an angle 316. Angle 316 may be in the range between approximately 0° and approximately 30°, such as between approximately 0° and approximately 15°, such as between approximately 0° and approximately 10°.

Additionally, in some embodiments, the outer surface 312 may be tapered. For example, the outer surface 312, or a portion thereof, may taper in the flow direction 244 of the resin 214, or opposite to the flow direction 244 of the resin 214. Alternatively, the outer surface 312 may be generally constant with no taper.

As shown in FIG. 13, in exemplary embodiments, a projection 300 may have a tapered cross-sectional profile. For example, the cross-sectional profile, or a portion thereof, may taper in the flow direction 244 of the resin 214, as shown. Further, the taper may occur at an angle 318 with respect to the inner wall, such as inner wall 302, from which the projection 300 extends. Angle 318 may be in the range between approximately 0° and approximately 30°, such as between approximately 0° and approximately 15°, such as between approximately 0° and approximately 10°. Alternatively, however, the cross-sectional profile may taper opposite to the flow direction 244 of the resin 214, or may be generally constant with no taper.

The projections 300 included in gate passage 270 may generally be positioned side-by-side across the width of the gate passage 270. In some embodiments, the projections 300 may be in contact with each other. In other embodiments, as shown in FIGS. 4, 5, 12, and 13, the projections 300 may be spaced apart to define passages 320 therebetween. Resin 214 flowing through the gate passage 270 may thus, in these embodiments, flow over the projections 300 and through the passages 320.

By diffusing the resin 214 in the gate passage 270, the projections 300 promote generally uniform flow of the resin 214 such that the resin 214 generally uniformly coats the rovings 142. Further, by diffusing the resin 214 within the gate passage 270, the projections 300 may increase the velocity of the resin 214 in the manifold assembly 220, and may reduce or prevent scalloping and other non-uniform flow patterns in the resin 214 within and exiting the gate passage 270.

Upon exiting the manifold assembly 220 and the gate passage 270 of the die 150 as shown in FIG. 4, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214. Impingement on the rovings 142 may be facilitated by the velocity of the resin 214 when it impacts the rovings 142, the proximity of the rovings 142 to the resin 214 when the resin exits the manifold assembly 220 or gate passage 270, or other various variables.

As shown in FIG. 4, the coated rovings 142 are traversed in run direction 282 through impregnation zone 250. The impregnation zone 250 is in fluid communication with the manifold assembly 220, such as through the gate passage 270 disposed therebetween. The impregnation zone 250 is configured to impregnate the rovings 142 with the resin 214.

For example, as discussed above, in exemplary embodiments as shown in FIGS. 4 and 14 through 19, the impregnation zone 250 includes a plurality of contact surfaces 252. The rovings 142 are traversed over the contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 4, the impregnation zone 250 is defined between two spaced apart opposing plates 256 and 258. First plate 256 defines a first inner surface 257, while second plate 258 defines a second inner surface 259. The impregnation zone 250 is defined between the first plate 256 and the second plate 258. The contact surfaces 252 may be defined on or extend from both the first and second inner surfaces 257 and 259, or only one of the first and second inner surfaces 257 and 259.

In exemplary embodiments, as shown in FIGS. 4, 15, and 17 through 19, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

Angle 254 at which the rovings 142 traverse the contact surfaces 252 may be generally high enough to enhance shear and pressure, but not so high to cause excessive forces that will break the fibers. Thus, for example, the angle 254 may be in the range between approximately 1° and approximately 30°, and in some embodiments, between approximately 5° and approximately 25°.

As stated above, contact surfaces 252 typically possess a curvilinear surface, such as a curved lobe, pin, etc. Further, in many exemplary embodiments, the impregnation zone 250 has a waveform cross-sectional profile. In one exemplary embodiment as shown in FIGS. 4, 14 and 15, the contact surfaces 252 are lobes that form portions of the waveform surfaces of both the first and second plates 256 and 258 and define the waveform cross-sectional profile. FIG. 14 illustrates the second plate 258 and the various contact surfaces thereon that form at least a portion of the impregnation zone 250 according to these embodiments.

In other embodiments, as shown in FIG. 16, the contact surfaces 252 are lobes that form portions of a waveform surface of only one of the first or second plate 256 or 258. In these embodiments, impingement occurs only on the contact surfaces 252 on the surface of the one plate. The other plate may generally be flat or otherwise shaped such that no interaction with the coated rovings occurs.

In other alternative embodiments, as shown in FIGS. 17 through 19, the impregnation zone 250 may include a plurality of pins (or rods) 260, each pin having a contact surface 252. The pins 260 may be static, as shown in FIGS. 17 and 18, freely rotational (not shown), or rotationally driven, as shown in FIG. 19. Further, the pins 260 may be mounted directly to the surface of the plates defining the impingement zone, as shown in FIG. 17, or may be spaced from the surface as shown in FIGS. 18 and 19. It should be noted that the pins 260 may be heated by heaters 133, or may be heated individually or otherwise as desired or required. Further, the pins 260 may be contained within the die 150, or may extend outwardly from the die 150 and not be fully encased therein.

In further alternative embodiments, the contact surfaces 252 and impregnation zone 250 may comprise any suitable shapes and/or structures for impregnating the rovings 142 with the resin 214 as desired or required.

To further facilitate impregnation of the rovings 142, they may also be kept under tension while present within the die 150, and specifically within the impregnation zone 250. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 4 and FIGS. 20 and 21, in some embodiments, a land zone 280 may be positioned downstream of the impregnation zone 250 in run direction 282 of the rovings 142. The rovings 142 may traverse through the land zone 280 before exiting the die 150. In some embodiments, as shown in FIG. 20, at least a portion of the land zone 280 may have an increasing cross-sectional profile in run direction 282, such that the area of the land zone 280 increases. The increasing portion may be the downstream portion of the land zone 280 to facilitate the rovings 142 exiting the die 150. Alternatively, the cross-sectional profile or any portion thereof may decrease, or may remain constant as shown in FIG. 21.

As further shown in FIG. 4, in some embodiments, a faceplate 290 may adjoin the impregnation zone 250. The faceplate 290 may be positioned downstream of the impregnation zone 250 and, if included, the land zone 280, in the run direction 282. Faceplate 290 is generally configured to meter excess resin 214 from the rovings 142. Thus, apertures in the faceplate 290, through which the rovings 142 traverse, may be sized such that when the rovings 142 are traversed therethrough, the size of the apertures causes excess resin 214 to be removed from the rovings 142.

Additionally, other components may be optionally employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This helps achieve uniform distribution of strength properties. Such an assembly may include a supply of compressed air or another gas that impinges in a generally perpendicular fashion on the moving rovings that pass across exit ports. The spread rovings may then be introduced into a die for impregnation, such as described above.

The impregnated rovings that result from use of the die and method according to the present disclosure may have a very low void fraction, which helps enhance their strength. For instance, the void fraction may be about 3% or less, in some embodiments about 2% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the polymer matrix, which may then be used to calculate the "void fraction" based on the following equations:

$$V_f = 100 * (\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the polymer matrix (e.g., at the appropriate crystallinity);

$\rho_f$ is the density of the fibers;

$W_f$ is the weight fraction of the fibers; and $W_m$ is the weight fraction of the polymer matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the polymer, fibers, and ribbon in accordance with ASTM D 2734-09 (Method A), where the densities may be determined ASTM D792-08 Method A. Of course, the void fraction can also be estimated using conventional microscopy equipment.

The present disclosure is further directed to a method for impregnating at least one fiber roving 142 with a polymer resin 214. The method generally includes flowing a polymer resin 214 through a manifold assembly 220. The manifold assembly 220 includes at least one channel 222 or branched runner 222, as discussed above. The method further includes flowing the polymer resin 214 from the manifold assembly 220 into a gate passage 270, and diffusing the polymer resin 214 within the gate passage 270. For example, at least one projection 300 may be included in the gate passage 270 to diffuse the polymer resin 214, as discussed above. The method further includes coating the fiber rovings 142 with the resin 214, as discussed above. Further, the method includes traversing the coated roving 142 through an impregnation zone 250 to impregnate the rovings 142 with the resin 214, as discussed above.

As discussed above, in some embodiments, the step of flowing the resin 214 through the manifold assembly 220 may include flowing the resin 214 through an outlet region 242 of the manifold assembly 220. Further, the method may include traversing the rovings 142 from the impregnation zone 250 through a land zone 280 and/or traversing the rovings 142 through a faceplate 290, as discussed above.

As discussed above, after exiting the impregnation die 150, the impregnated rovings 142, or extrudate 152, may be consolidated into the form of a ribbon. The number of rovings employed in each ribbon may vary. Typically, however, a ribbon will contain from 2 to 20 ravings, and in some embodiments from 2 to 10 rovings, and in some embodiments, from 3 to 5 ravings. To help achieve the symmetric distribution of the ravings, it is generally desired that they are spaced apart approximately the same distance from each other within the ribbon. Referring to FIG. 22, for example, one embodiment of a consolidated ribbon 4 is shown that contains three (3) rovings 5 spaced equidistant from each other in the −x direction. In other embodiments, however, it may be desired that the ravings are combined, such that the fibers of the rovings are generally evenly distributed throughout the ribbon 4. In these embodiments, the rovings may be generally indistinguishable from each other. Referring to FIG. 23, for example, one embodiment of a consolidated ribbon 4 is shown that contains rovings that are combined such that the fibers are generally evenly distributed.

A pultrusion process may further be utilized according to the present disclosure for certain particular applications. For example, in some embodiments, such process may be utilized to form a rod. In these embodiments, continuous fibers of rovings 142 may be oriented in the longitudinal direction (the machine direction "A" of the system of FIG. 1) to enhance tensile strength. Besides fiber orientation, other aspects of the pultrusion process may be controlled to achieve the desired strength. For example, a relatively high percentage of continuous fibers are employed in the consolidated ribbon to provide enhanced strength properties. For instance, continuous fibers typically constitute from about 25 wt. % to about 80 wt. %, in some embodiments from about 30 wt. % to about 75 wt. %, and in some embodiments, from about 35 wt. % to about 60 wt. % of the ribbon. Likewise, polymer(s) typically constitute from about 20 wt. % to about 75 wt. %, in some embodiments from about 25 wt. % to about 70 wt. %, and in some embodiments, from about 40 wt. % to about 65 wt. % of the ribbon.

In general, ribbons may be supplied to the pultrusion system directly from impregnation die 150, or may be supplied from spindles or other suitable storage apparatus. A tension-regulating device may be employed to help control the degree of tension in the ribbons as they are drawn through the pultrusion system. An oven may be supplied in the device for heating the ribbons. The ribbons may then be provided to a consolidation die, which may operate to compress the ribbons together into a preform, and to align and form the initial shape of the desired product, such as a rod. If desired, a second die (e.g., calibration die) may also be employed that compresses the preform into a final shape. Cooling systems may additionally be incorporated between the dies and/or after either die. A downstream pulling device may be positioned to pull products through the system.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A die for impregnating at least one fiber roving with a polymer resin, the die comprising:
 a manifold assembly for flowing the resin therethrough, the manifold assembly comprising a channel;
 an impregnation zone in fluid communication with the manifold assembly, the impregnation zone configured to impregnate the roving with the resin; and
 a gate passage between the manifold assembly and the impregnation zone for flowing the resin from the manifold assembly such that the resin coats the roving, the gate passage comprising a plurality of projections configured to diffuse resin flowing through the gate passage, each of the plurality of projections extending from an inner surface of the gate passage, the plurality of projections positioned side-by-side across a width of the gate passage and spaced apart to define passages therebetween.

2. The die of claim 1, wherein each of the plurality of projections has a tapered cross-sectional profile in a flow direction of the resin through the gate passage.

3. The die of claim 1, wherein each of the plurality of projections includes an outer surface and at least one side surface, the at least one side surface extending between the outer surface and an inner surface of the gate passage, and wherein the at least one side surface is tapered towards the outer surface.

4. The die of claim 1, wherein the manifold assembly further comprises a plurality of channels.

5. The die of claim 4, wherein each of the plurality of projections corresponds to one of the plurality of channels.

6. The die of claim 4, wherein the plurality of channels are a plurality of branched runners.

7. The die of claim 6, wherein the plurality of branched runners have a symmetrical orientation along a central axis.

8. The die of claim 1, wherein at least a portion of the channel is curvilinear.

9. The die of claim 1, wherein the manifold assembly defines an outlet region, and wherein at least a portion of the channel disposed in the outlet region has an increasing area in a flow direction of the resin.

10. The die of claim 1, wherein the manifold assembly defines an outlet region, and wherein at least a portion of the channel disposed in the outlet region has a curvilinear cross-sectional profile.

11. The die of claim 1, wherein the gate passage extends vertically between the manifold assembly and the impregnation zone.

12. The die of claim 1, wherein at least a portion of the gate passage as a decreasing cross-sectional profile in a flow direction of the resin.

13. The die of claim 1, wherein the resin is a thermoplastic resin.

14. The die of claim 1, wherein the resin is a thermoset resin.

15. A method for impregnating at least one fiber roving with a polymer resin, the method comprising:

flowing a polymer resin through a manifold assembly, the manifold assembly comprising a channel;

flowing the polymer resin from the manifold assembly into a gate passage;

diffusing the polymer resin within the gate passage by flowing the polymer resin past a plurality of projections, each of the plurality of projections extending from an inner surface of the gate passage, the plurality of projections positioned side-by-side across a width of the gate passage and spaced apart to define passages therebetween;

coating at least one fiber roving with the resin; and traversing the coated roving through an impregnation zone to impregnate the roving with the resin.

16. The method of claim 15, wherein flowing the resin through the manifold assembly comprises flowing the resin through an outlet region of the manifold assembly, and wherein at least a portion of the channel disposed in the outlet region has an increasing area in a flow direction of the resin.

17. The method of claim 15, wherein at least a portion of the gate passage has a decreasing cross-sectional profile in a flow direction of the resin.

18. The method of claim 15, further comprising coating a plurality of rovings with the resin and traversing the coated rovings through the impregnation zone.

* * * * *